Figure 1:
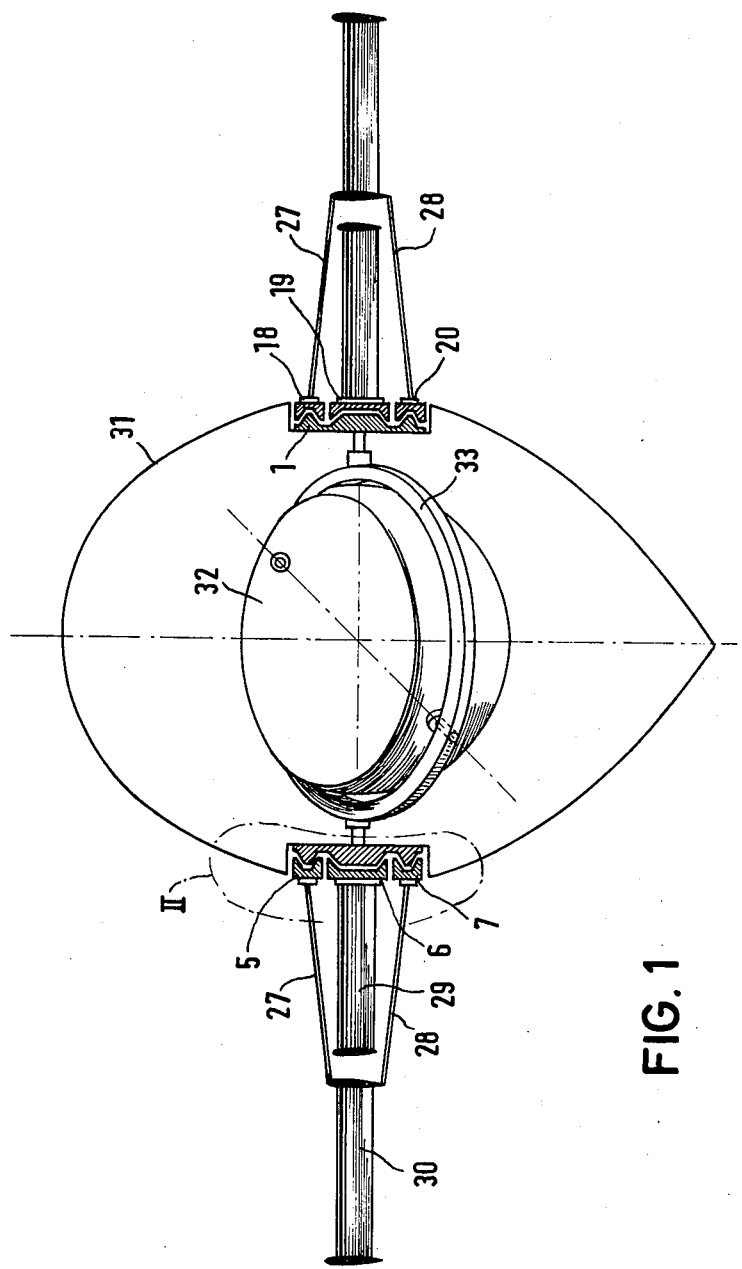

United States Patent [19]

Kling

[11] 3,997,131

[45] Dec. 14, 1976

[54] ROTOR MEANS FOR AN AIRCRAFT

[76] Inventor: Alberto Kling, Am Hugel 14, 8136 Percha, Germany

[22] Filed: Apr. 5, 1976

[21] Appl. No.: 673,867

Related U.S. Application Data

[63] Continuation of Ser. No. 531,075, Dec. 9, 1974, abandoned.

[30] Foreign Application Priority Data

Dec. 12, 1973 Germany .......................... 2361852
Apr. 29, 1974 Germany .......................... 2420709

[52] U.S. Cl. .......................... 244/23 R; 244/17.19; 244/23 C; 416/126; 416/129
[51] Int. Cl.² .......................... B64C 29/00
[58] Field of Search ......... 244/17.11, 17.17, 17.19, 244/17.23, 23 R, 23 C, 134 P; 290/413, 6, 44, 55; 310/114–116; 416/61, 126, 128, 129

[56] References Cited

UNITED STATES PATENTS

| | | | |
|---|---|---|---|
| 2,462,182 | 2/1949 | Guerdan et al. | 310/115 |
| 3,187,190 | 6/1965 | Lang | 416/128 X |
| 3,395,876 | 8/1968 | Green | 244/23 C |

Primary Examiner—Stephen G. Kunin
Attorney, Agent, or Firm—Stevens, Davis, Miller & Mosher

[57] ABSTRACT

A rotor arrangement for an aircraft comprising two coaxially counter-rotatable rotors, each rotor being journaled freely rotatable about an imaginary axis of rotation common to both rotors on or through a fuselage part or a support member, each fuselage part or support member being either rigidly connected to or journaled on the fuselage, each rotor together with the other respective rotor or with the component part of the support member or fuselage part supporting the first mentioned rotor constituting an integral part of an electromotor by forming the counteracting parts of the electromotor ("rotor" and "stator") which rotate relative to one another by securing a plurality of poles of the electromotor to the respective rotor and by arranging on the other counter-rotating rotor or on the component part of the support member or fuselage part supporting the first mentioned rotor the corresponding poles of the electromotor facing toward the poles of the respective rotor such that a reciprocal field effect exists, at least the poles provided on one rotor or on the respective component part of the support member or fuselage part being electrically connected to a current generator which produces a frequency current.

43 Claims, 19 Drawing Figures

ROTOR MEANS FOR AN AIRCRAFT

This is a continuation of application Ser. No. 531,075 filed Dec. 9, 1974 now abandoned.

This invention relates to a rotor means for an aircraft, comprising two coaxially counter-rotating rotors which are driven by means of a drive means.

In known aircrafts having rotor means of the type explained at the outset, the two counter-rotating rotors are driven by a drive means which is coupled to the two rotors via a reduction transmission and torque transmission means. The drive systems known at the present time in the aviation industry, e.g. turbines or piston-type internal combustion engines, have output speeds which are too high to enable direct coupling of rotors which have to rotate at a lower speed. Hence, a direct coupling of the drive shaft of known drive systems to one rotor and of the drive housing to the other rotor is not possible. Even if such a direct coupling were executed with slow-running piston machines, the drive machine would malfunction very quickly for other reasons. The rotation of the motor block which would then occur would very rapidly prevent adequate oil lubrication and the resultant centrifugal forces would wear the individual parts of the drive very rapidly and non-uniformly. Very heavy and complicatedly constructed transmission gearboxes are necessary between the drive means and the rotors in the case of coaxial counter-rotating rotors if the fact that torques are transmitted to the fuselage of the aircraft supporting the rotors is supposed to be avoided.

A helicopter with counter-rotating rotors is described in U.S. Pat. No. 2,996,269 in which a transmission gearbox is connected between the drive motor and the rotors and is constructed such that no torques are transmitted to the cell of the helicopter. In this known helicopter a complicated planetary gear system constructed from a plurality of parts is employed to transmit the driving torques from the drive means to the rotors and to prevent that torques are transmitted to the cell. This transmission is disadvantageously heavy, is very expensive to manufacture, requires servicing and is prone to failure or malfunction. Due to the variety of required gear pairs, there is also danger in the case of this known transmission that undesirable vibrations will occur and a high inherent reduction in performance will result due to frictional losses which greatly reduce the drive output and thus the efficiency as well.

The object of this invention is to provide a rotor means of the type quoted at the outset which has a simple construction and makes rotation of the counter-rotating rotors possible at low rotational speeds without the use of reduction transmissions and without transmitting reaction torques to the cell, which permits the use of a high-speed aircraft engine as the source of energy for the drive means as the case may arise and/or permits the use of a stationary drive system if necessary, is reliable in operation and is infinitely regulatable.

This object is accomplished in accordance with the invention in that each of the rotors is journaled freely rotatable about an imaginary axis of rotation common to both rotors on or through either a fuselage part or a support member, each fuselage part or support member being either rigidly connected to or journaled on the fuselage, that each rotor together with the other respective rotor or with the component part of the support member or fuselage part supporting the first mentioned rotor constitutes an integral part of an electromotor by forming the counteracting parts of the electromotor ("rotor" and "stator") which rotate relative to one another by securing a plurality of poles of the electromotor to the respective rotor and by arranging on the other counter-rotating rotor or on the component part of the support member or fuselage part supporting the first mentioned rotor the corresponding poles of the electromotor facing toward the poles of the respective rotor such that a reciprocal field effect exists, that at least the poles provided on one rotor or on the respective component part of the support member or fuselage part are electrically connected to a current generator which produces a frequency current.

In the inventive rotor means, each of the two counter-rotating rotors not only serves as a propeller, but simultaneously constitutes one part of an electromotor with a moving field. The inventive rotor means may be designed in two fundamentally different alternatives. In the case of the one alternative, the two rotors form together the relatively rotatable parts of an electromotor having a moving field. Unlike conventional electromotors, one part is not secured in a stationary fashion stator, while the other part rotates relative to said stationary part rotor, but rather both parts "rotors" rotate relative to one another in opposite sense, the relative speed corresponding to the relative speed which would result if a rotating part were itself held in position and only the other part would rotate. The freely rotatable journaling of the two counter-rotating rotors ensures that neither of these rotors exerts a torque on the source of energy arranged in the cell. Transmission and reduction gearboxes between the energy source in the cell and the counter-rotating rotors are completely absent in the inventive rotor means. The inventive construction ensures that the same torque is exerted on both counter-rotating rotors irrespective of whether both rotors have the same diameter and whether they have the same rotational speed.

In the case of the other alternative of the construction of an inventive rotor means, each rotor itself is the rotor of an electromotor, while the stator cooperating therewith is designed in the form of a plurality of poles arranged on the periphery of a component part of the support member. Each of the rotors thus forms an electromotor together with the associated support member component part. The control of the current supply to the poles of each of these electromotors ensures that the rotors of the inventive rotor means rotate in opposite sense. A torque dependent on the electrical field is produced between each rotor and the associated component part of the support member. When the rotors are counter-rotated on the support member, the torques produced on the support member may either be compensated for completely by correspondingly controlling the current supply or, if desired, may be adjusted such that the support member and thus a cell attached thereto is rotated. Transmission and reduction gearboxes between an energy source driving the rotors and the counter-rotational rotors is also completely absent in this construction of the inventive rotor means. The construction of the inventive rotor means has the substantial advantage that it is sufficient if the current is supplied to the poles of the respective stator, i.e., those poles arranged on the respective support member component part, in the case of each electromotor formed by a rotor and stator. A current supply to the poles of the respective rotor is not absolutely necessary. The poles of the rotors may be designed as permanent magnets. In this way, the problem of having to provide current via slip ring contacts and similar current bridges which bridge relative movements is eliminated in this construction of the inventive rotor means. The poles of the support member component parts may be connected to the energy source via electrical leads which are rigidly connected to the poles. The result is very high reliability in operation. In the embodiment of the inventive rotor means in which each rotor is a component part of an electromotor which is controllable and driven separately from the other rotor, rotations of the support member supporting the rotors may be achieved in the plane of rotation in either of the two senses of rotation by means of a corresponding individual control of the rotational speed of the two rotors so that the angular alignment of a cell (cabin, instrument platform etc.), which is journaled in the support member and rotates together therewith, may be changed or maintained as desired. The torque achieved in this manner is coaxial with the common imaginary axis of rotation of the two counter-rotating rotors.

The inventive rotor means may also be employed to great advantage in captive aircraft, i.e., in aircraft which remain connected to ground means even during flight via control and/or energy supply lines. For instance, the power source in the inventive rotor means may be readily installed on the ground in a stationary fashion, the current pulses to drive the rotor means being supplied to the poles on the component part of the support member associated with the respective rotor via an electric cable connected to the support member of the rotor means. In this construction, relatively heavy power sources and control means may be used to drive an aircraft without the aircraft having to bear the weight of the power source and the control means during flight. This may increase considerably the payload supported by the aircraft.

In aviation today there is a frequent demand for a constant rotational speed for drive means. This demand for a constant rotational speed imposes certain limitations on the design and operation of propellers and rotors. Since internal combustion engines operate most efficiently at an optimum constant speed, it is customary nowadays to provide the attached propeller or rotor with a means which permits an adjustment of the blade pitch angle to match the propulsive speed of the rotor. Unfortunately it is not possible to change the blade twist at the same time to meet the increasing inflow velocity at the hub. Therefore, a compromise is normally made using a fixed blade twist with a variable blade pitch angle which are designed to achieve maximum efficiency at cruising speed. A solution to this problem would be, of course, to simultaneously vary the pitch angle and twist, or better still, to desist from the constant speed principle and use a drive means which has variable speed with constant efficiency and driving the rotor at a precalculated fixed blade pitch angle and twist.

A substantial advantage of the inventive rotor means is that it solves the aforecited problem of driving the rotors at a variable speed with maximum output and constant optimum efficiency at each rotational speed. This eliminates the variable pitch propellers needed to match forward flight velocity variations when a constant speed drive means is used. An optimum rotor blade pitch angle and an optimum rotor blade twist can be precalculated and set once and for all. Thus the matching of the rotor speed with increasing forward flight speed becomes automatic. This means that the optimum angle of attack of the blades over their length from root to tip is always obtained, thereby permitting a simple design and simple operation of an aircraft.

The inventive rotor means is advantageously designed such that the two rotors or each rotor forms the parts of a high frequency electromotor together with the associated support member component part. The inventive rotor drive can thus be accomplished with a plurality of poles distributed about the periphery of the rotors or with a plurality of poles distributed about the periphery of the respective rotor and about the periphery of the associated support member component part, thereby resulting in a very low constructional weight. In the configuration of the inventive rotor means, in which the two rotors together form an electromotor, it is possible to regulate the rotational speed of the counter-rotating rotors by regulating the current frequency of the current produced by the current generator. In the configuration of the inventive rotor means, in which each rotor forms an electromotor together with the associated support member component part, it is possible by regulating the frequency, phase setting, polarity and amount of current supplied to the "stator" poles of each electromotor to control and regulate not only the rotational speed and power of each of the two rotors but the sense of rotation of the rotors as well. Due to the arrangement of the poles relative to the rotors and due to the configuration of the rotors having large interior and exterior diameters, in all the configurations of the inventive rotor means there is ample space available on the rotors or on the associated component parts of the support member or fuselage parts to accommodate a plurality of poles thus achieving a very small pole division. Such a small pole division makes the use of high frequency fields possible. With a small pole division, it is also possible to make the individual poles very light and small, thereby producing in entirety a very low weight for the rotor drive means.

An advantageous development of the inventive rotor means is produced in that the current generator is designed as a generator which is equipped with a small number of poles and which is driven at a high rotational speed.

In the embodiment of the inventive rotor means, in which the two counter-rotating rotors together form an electromotor, it is advantageous if numbers of poles exceeding the generator pole number are provided on both rotors. In so doing, each pole of the generator is associated with a plurality of poles of each rotor. A reduction of speed between a generator operating at a high speed and the rotors which rotate at a lower speed is attained in this manner without having to interpose a reduction gear.

The embodiment of the inventive rotor means, in which each rotor forms an electromotor together with the associate support member component part, is favorably developed such that numbers of poles exceeding the generator pole number are provided on the support member component parts associated with the two rotors. A plurality of poles of each stator is associated with each pole of a generator. The current issuing from the generator is supplied to each stator via the control means. This current controls and regulates individually the rotational sense of the field produced in the poles of the respective stator as well as the frequency and amount of current supplied to each stator. In this manner, a reduction of speed between a generator operating at a higher speed and the rotors which rotate at a lower speed is achieved without having to interpose mechanical reduction gears.

If the current generator is designed as a generator which is equipped with a small number of poles and which is operated at a high rotational speed, as was already described hereinbefore, a grading can be effected in both embodiments of the inventive rotor means between the high speed motor-generator unit and the counter-rotating rotors which form an electromotor or between the high speed motor-generator unit and the counter-rotating rotors forming the respective electromotor by means of the electrical coupling of the number of poles in the generator and the plurality of poles on the rotors forming an electromotor or on the stators of the electromotors of the rotor means, since the speed of the rotors forming one or more electromotors is proportional to the frequency of the electric current transmitted and inversely proportional to the number of poles (in this context reference is made to the explanation of three-phase motors or rotary field motors for example). A generator equipped with a few poles may be driven directly by a conventional high-speed internal combustion engine and the currents produced may be used to drive the rotors at a very much lower rotational speed by arranging a large number of poles on the rotors or on the stators associated with the respective rotor.

A particularly favorable embodiment is achieved in that the current generator is designed as a polyphase generator. For instance, the generator may be designed as a conventional three-phase current generator, but this is not absolutely necessary. The current generator may also be designed as a generator which produces current having more than three phases.

It is especially advantageous in the inventive rotor means if the current generator is designed as a high frequency generator. High frequency generators, which are operated at a high rotational speed, not only have the advantage that they may be coupled directly to high speed aircraft engines, but they also have the very substantial advantage that they have a very low power-to-weight ratio (KVA/kg).

Another favorable configuration of the inventive rotor means is produced in that the current generator is designed as a DC power source with an electronic frequency converter unit connected downstream which produces the high frequency currents required to supply the poles. In this embodiment, for example, a DC voltage may be produced by means of a battery or a DC generator driven by a conventional aircraft engine. This DC voltage is supplied to a frequency conversion unit in which the DC voltage may be subdivided into several phase-shifted time-variable currents (i.e. high frequency AC voltage currents). These AC voltage currents are then fed in the one embodiment of the inventive rotor means to the poles of the counter-rotating rotors and, in the other embodiment of the inventive rotor means, the poles of the stators of the two electromotors are supplied. The rotational speed of the rotors is controlled by means of the frequency conversion unit.

A simple structural configuration of the inventive rotor means is achieved in that each current-supplied pole of a rotor or of a support member component part is constructed as a core of magnetizable material wound in a coil traversed by current.

A favorable embodiment, in particular in the construction of the inventive rotor means, in which the two counter-rotating rotors together form an electromotor, is obtained in that slip contact elements are provided on each rotor having poles traversed by current, said slip contact elements slidingly abutting on conductor bands which extend concentrically to the axis of rotor rotation and which are provided on the fuselage or on the support member, and that each conductor band is electrically connected to a current output of a stationary current generator which is arranged in the fuselage or connected via a remote line. The currents produced by the current generator can thus be conducted to the poles which are mounted on the freely rotating rotors in a simple and reliable manner.

The inventive rotor means does not exert any unintentional reaction torques caused by the drive of the rotors on the aircraft cell which is supported by the rotors. It is therefore particularly well suited as a rotor system for aircraft in which the rotor(s) are disposed on the outer periphery of a shell within which a cabin is suspended in a Cardanic suspension by means of a support assembly. In the inventive rotor means, the rotors run independently of the cell which supports them and do not exert any undesired drive reaction torques on the cell. It is therefore possible, for example, to design the cell as an instrument platform or as a passenger cabin which maintains its spacial position during flight irrespective of the rotors rotating thereabouts. This also makes it possible to provide a captive air-craft with the inventive rotor means because the cager secured to the cell may substantially maintain its position in space as well. The aircraft may be connected to control and energy supply means located on the ground by mooring lines.

In the embodiment of the inventive rotor means, in which the two counter-rotating rotors together form an electromotor, an additional sensitive control capacity may be achieved in that at least one selectively excitable magnet is arranged on the fuselage adjacent the path of rotation of the poles of each rotor such that in the excited state, the field of the magnet acts magnetically on the magnetic fields of the poles of the respective rotor. In this way, any differences in the speed of the rotors caused by bearing friction may be compensated for. It is also possible to permit the one or other rotor to run more slowly intentionally for a certain period of time for purposes of control, i.e. to effect changes in the angular position of the cell.

A favorable development of the control magnets can be effected in that each magnet is constructed as a core of magnetizable material surrounded by a coil traversed by current.

The inventive rotor means may be designed, for example, such that the two counter-rotating rotors are disposed coaxially above one another in two parallel planes.

An especially favorable embodiment of the inventive rotor means in light of its aerodynamic properties and operational efficiency which is also suitable as a rotor system in aircraft (operated and steered in accordance with the principle of gyroscopic precession) which have a cabin cardanically suspended inside the rotor system is achieved in that the rotor blade mounts of the two counter-rotating motors are arranged concentrically to one another.

A favorable embodiment of the inventive rotor means is obtained in that the first rotor together with the inner rotor blade mount includes one or more runners disposed in one plane on which the inner rotor blade mount is secured, and that the second rotor includes one or more upper runners which are arranged in a plane above the runners of the first rotor and one or more lower runners which are arranged in a plane below the runners of the first rotor, he rotor blade mount of the second rotor being connected via stays which extend above or below the inner rotor blade mount, to the upper runner(s) or the lower(s).

In the following, a few advantageous embodiments of the configuration of the inventive rotor means will be given in which the two counter-rotating rotors together form an electromotor.

One embodiment which is stable and simple in construction is attained in that the rotors each include one hoop on which the respective rotor blade mount is secured, that said hoop of the inner rotor is journaled rotatably thereon in a concentric fashion outside the hoop of the outer rotor, that the hoop of the outer rotor is journaled rotatably thereon in a concentric fashion outside a support part disposed on the fuselage and designed as a support hoop, and that the rotor blade mount of the outer rotor is connected to the hoop of the outer rotor via stays which extend above or below the inner rotor.

Another constructive embodiment is achieved in that two coaxial support hoops surrounding the fuselage in radial spaced relation are provided in axial spaced relation from one another, each of which is connected to the fuselage or a support construction journaled thereupon by means of a plurality of stays, and that the inner rotor is rotatably journaled on these support hoops such that its rotor blades extend inwardly in a radial fashion and the outer rotor is rotatably journaled such that its rotor blades extend outwardly in a radial fashion.

Another configuration of the rotor means which is free of stays is given in that the outer rotor is rotatably journaled on a support hoop secured to the outer periphery of the inner rotor.

Another embodiment is obtained in that the rotor blade mounts of the two counter-rotating rotors are arranged concentrically, that the inner rotor is rotatably journaled on the fuselage or on a support member journaled thereon and that the outer rotor is connected to the fuselage or said support member via stays which extend above or below the inner rotor. In this embodiment the fuselage or the support member is thus a component part of the outer rotor and rotates together therewith.

A similar configuration is given in that the rotor blade mounts of the two counter-rotating rotors are arranged concentrically, that the inner rotor is secured to the fuselage of a support member journaled thereon and that the outer rotor includes one or more runners arranged in a plane over the inner rotor and one or more runners arranged in a plane beneath the inner rotor, said runners being journaled in and running on paths of the fuselage or the support member which are coaxial to the axis of rotor rotation, the outer rotor being connected to the upper runner(s) and to the lower runner(s) via stays extending above or below the inner rotor. In this embodiment, the fuselage or the support member is thus a component part of the inner rotor and rotates therewith.

In the following embodiments of the configuration of the inventive rotor means will be described in which each rotor forms an electromotor together with the support member component part which supports said rotor.

One advantageous configuration is achieved in that a control device is provided for separately controlling the current supply to the poles of each support member component part in a counter-rotating sense. The rotational speeds of the two motors belonging to separate electromotors can thus be controlled individually and thus rotations of the support member supporting the rotors may be achieved in the plane of rotation in either one of the two senses of rotation so that the angular disposition of a cabin or an instrument platform which is journaled in the support member may be changed or maintained as desired. The torque produced in this manner is coaxail with the common imaginary axis of rotation of the two counter-rotating rotors.

The rotor means according to the invention is advantageously designed such that the control means is constructed to subdivide the high frequency current generated into individual current pulses of a specific sign and to supply specific pulse trains to the poles in response to the energy and the desired supply frequency to be fed to the respective rotor. In this embodiment, it is possible to generate a high frequency current in a high frequency generator and to subdivide this by means of the control means into individual successive pulses, for example, by reversing the polarity of the "minus" phases to "plus" phases in a wave-like high frequency current so that a dense sequence of successive plus current pulses is produced, that a sequence of minus current pulses is produced correspondingly after a specific time, and that the pulse train is reversed in polarity at constant time intervals. In this way, one is in a position to determine the frequency by selecting the intervals for a reversal in polarity and thus to supply to the poles with controlled frequency an AC current in which each current phase consists of a sequence of current pulses. With the aid of this control means, however, it is not only possible to control the frequency, but to also control the output supply. It is readily possible to suppress a specific number of pulses within each sequence after the generated high frequency current has been subdivided into a sequence of similarly poled pulses. In this manner, one is in a position to supply to the poles a specific number of pulses, i.e., a specific amount of current within each interval which is set with respect to its time duration and to therefore control the energy supplied to the electromotors. In this way, a simple possibility for controlling the inventive rotor means results which may be executed with high frequency generators and control means located in stationary positions on the ground if the current pulses are transmitted to the captive rotor means via lines.

The regulation of the phase setting and the polarity of the electric current (frequency current) is also executed in the control means in a known manner.

A very favorable further development of the inventive rotor means designed in the aforecited manner is achieved in that a measuring instrument, e.g. gyroscopic, inertial or electrical sensors, is provided for ascertaining the energy and frequency required for each rotor and for influencing the control means. By means of such a measuring instrument, which may be mounted on the aircraft and which supplies its signals to the control means, one is in a position to effect cabin orientation automatically in the inventive rotor means.

Another advantageous development of the inventive rotor means is achieved in that the control means is designed such that it controls the energy supply and frequency of the currents supplied to the pole coils from the power source in response to a feedback of the currents which are induced by the relative movement of rotor poles to the associated support member component part poles in the coils of the latter. It is possible to determine the exact time at which suitable current pulses must be sent to the coils of the stator poles with the air of such a control. It is also possible with the aid of this feedback control system to automatically control and regulate the suitable frequency and the appropriate pulse duration at any arbitrary rotary speed of the rotors.

A constructive configuration of this embodiment of the inventive rotor means is also attained in that a support hoop is provided which surrounds the fuselage in radial spaced relation and which is connected to the fuselage or a support construction journaled thereon by means of a plurality of stays arranged in two spaced tiers, and that at least the outer rotor is rotatably journaled on the support hoop and forms an electromotor therewith.

This embodiment may be designed in several modifications. For instance, the inner rotor may also be journaled on the support hoop. In this case, the outer rotor extends outwardly and the inner rotor extends inwardly from the support hoop. In other modifications, the inner rotor is rotatably journaled on the fuselage or on a support construction journaled thereon; the outer rotor may extend either outwardly or inwardly from the support hoop.

A favorable embodiment for both alternative configurations of the inventive rotor means (both rotors together form an electromotor or each rotor forms an electromotor respectively together with the associated support member component part) is achieved in that the journaling of each rotor on the fuselage or the support construction journaled on the fuselage or on another rotor is designed as a contact-free magnetic journaling where frictional losses and frictional torques are reduced significantly during rotation of the rotors. The magnetic bearing assemblies providing spacing functions for clearance and for centering purposes of the rotor- and drive means can be engineered utilizing known electro-magnetic and permanent-magnetic suspension system technics and are therefore shown in the attached drawings only in a highly schematical and simplified manner. Also electro-dynamic suspension system technics may be employed to engineer the journaling of the rotor-and drive means.

Many other embodiments of the rotor means according to the invention, which are not illustrated and described in particular, can be engineered to fit any requirements with respect to the horsepower output of the drive means associated with a stipulated thrust generation and variable rotational speeds of the rotors rendering possible to meet even complex specifications whether involving heavy lift capabilities with high lift to power ratio or involving high forward speed capabilities to suit special task destinations of an aircraft. In the latter case where considerations of lift to power ratio are mostly of secondary importance, the inventive rotor means allows to design a variety of possible embodiments where a plurality of pluralities of counter-rotating rotors are arranged in several planes in adequate axial spaced relation to each other. If the rotors employed in these multiple stage embodiments are provided with duct hoops, which produce a cylindrically shaped downflow, even the construction of an open (not encased) axial flow electric turbine can be achieved. In said multiple stage embodiments the counter-rotating rotors form together with component parts of the support member or fuselage parts or directly between each other the opposite parts of one or more electromotor(s) (rotor(s) and stator(s)). A plurality of electromotors working in different stages may either be synchronized or driven independently from each other.

Further embodiments of the present invention are feasible where a plurality of counter-rotating rotors is arranged in radial spaced relation to each other, disposed coplanarly or in different planes, forming the parts of electromotors as hereinbefore described.

Figure 2:
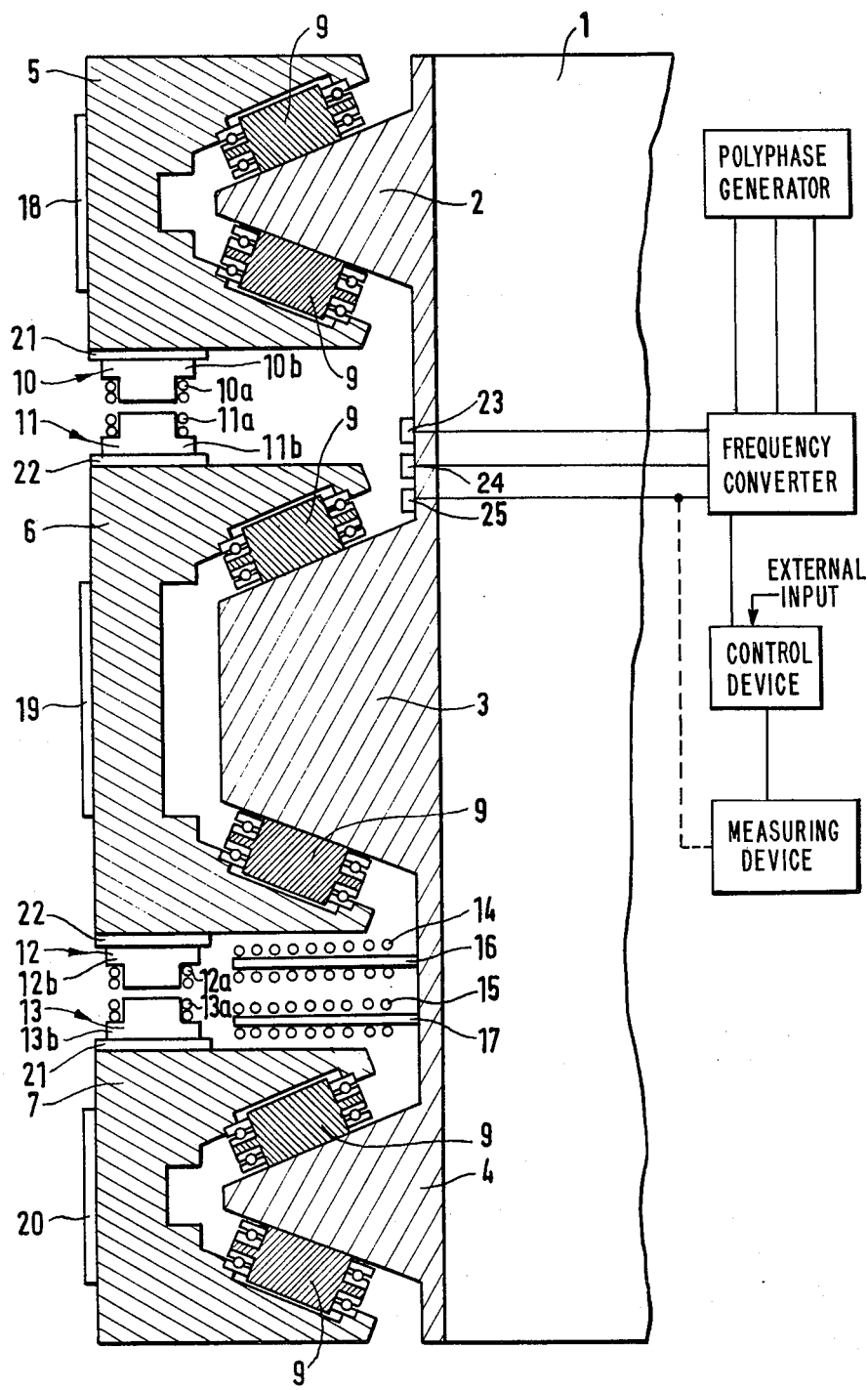
Figure 3:
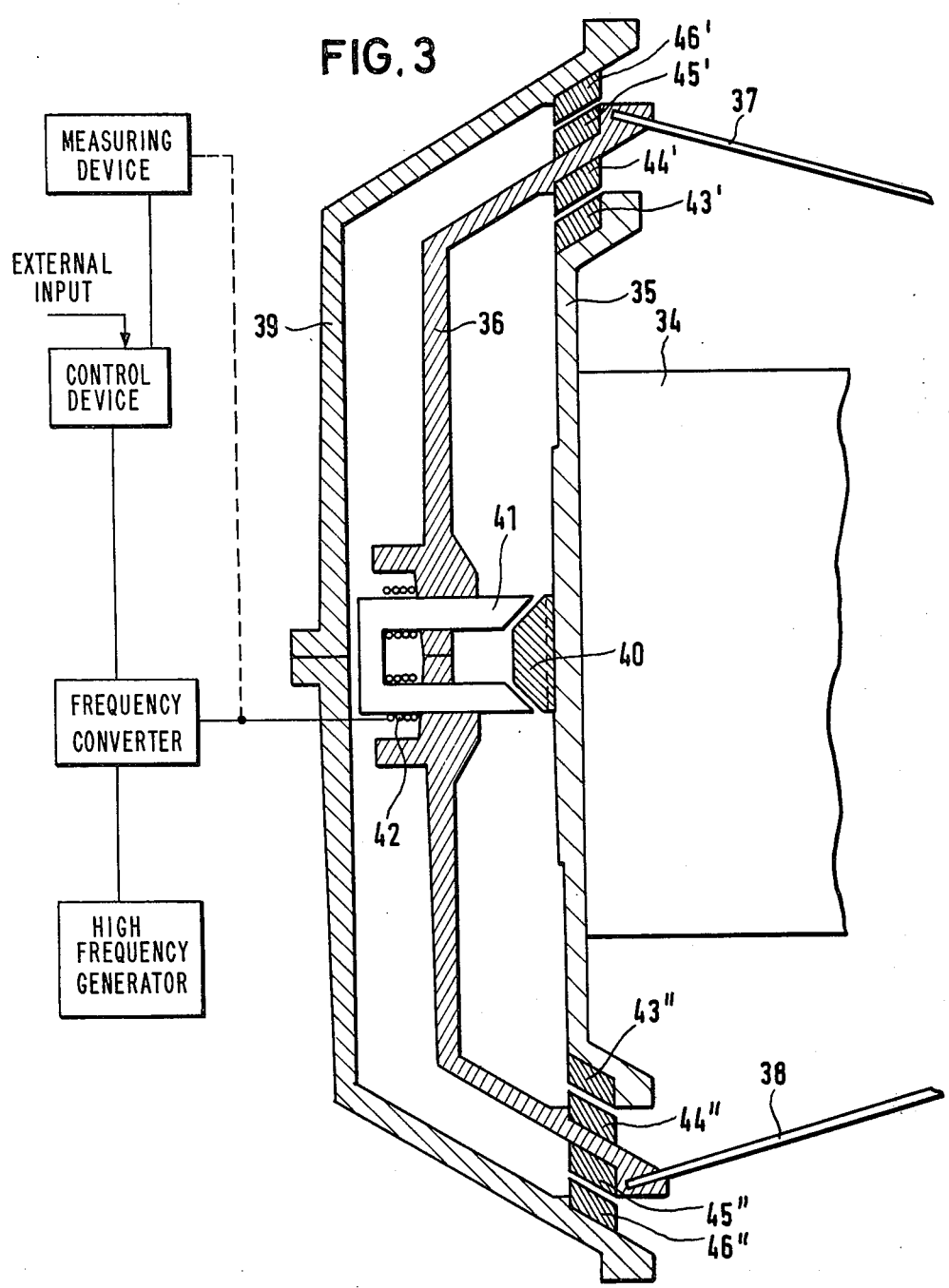
Figure 4:
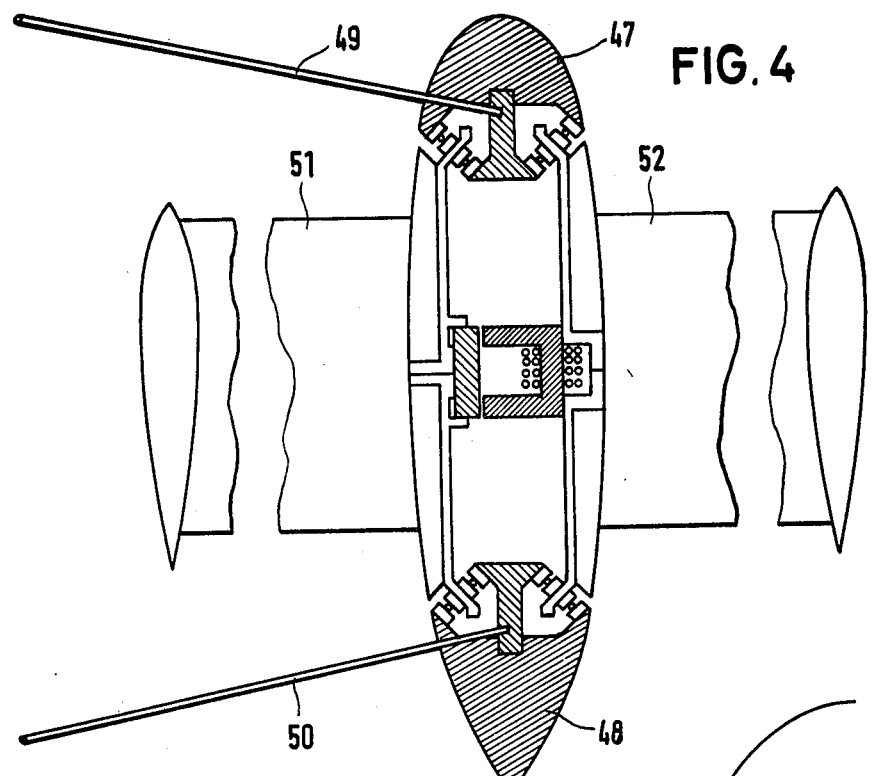
Figure 5:
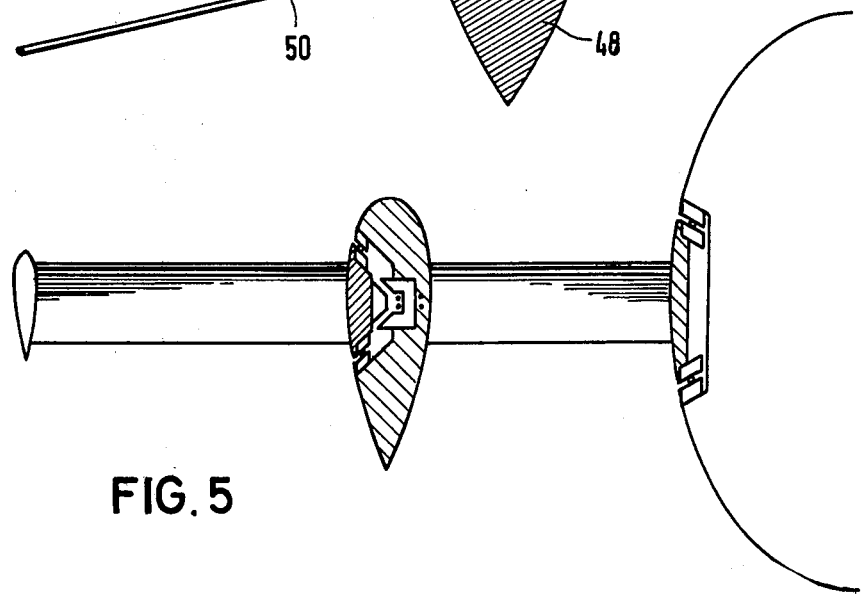
Figure 6:
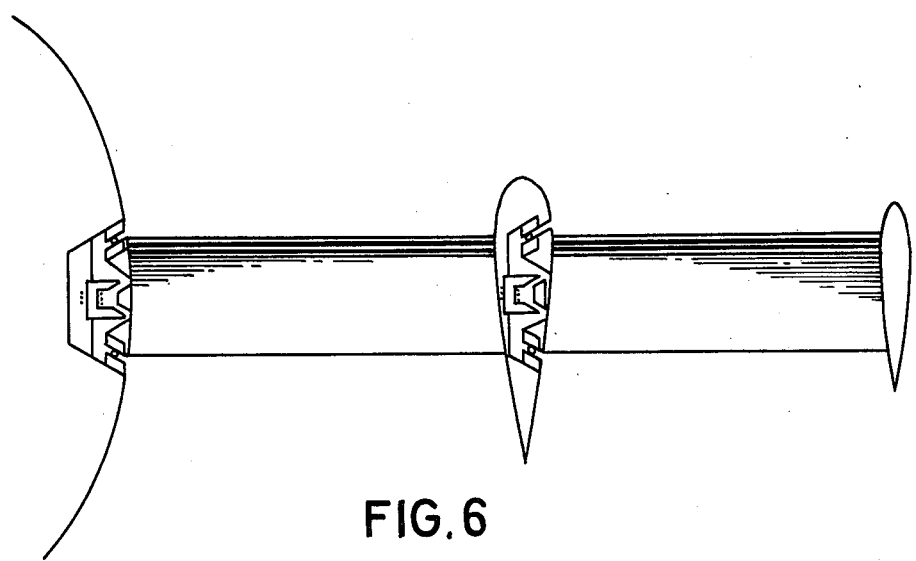
Figure 7:
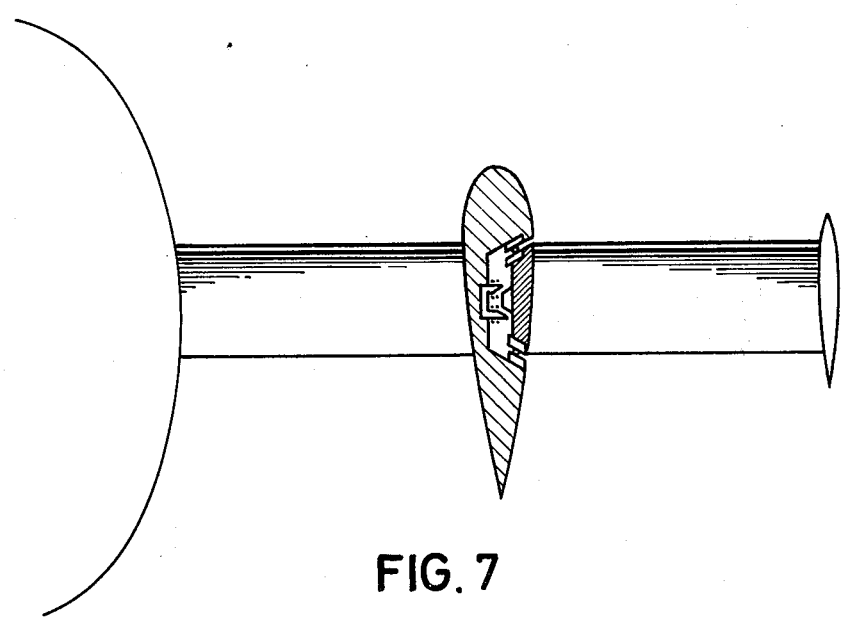
Figure 8:
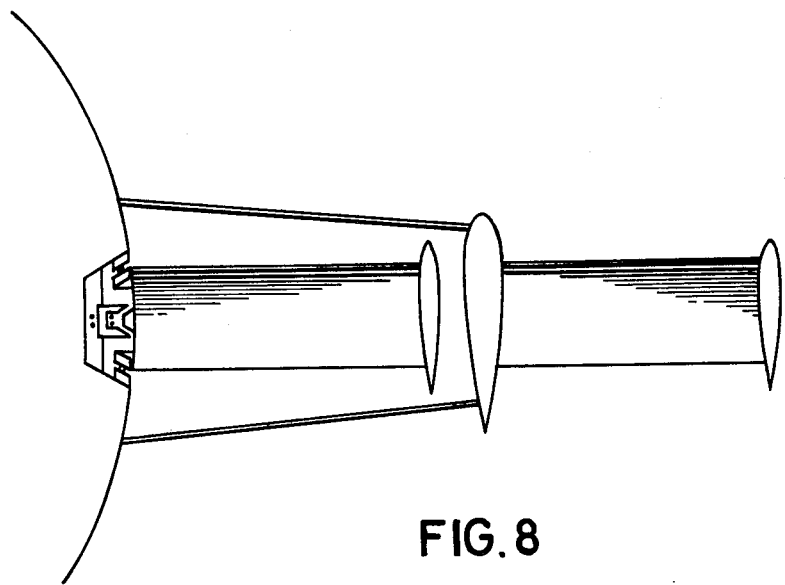
Figure 9:
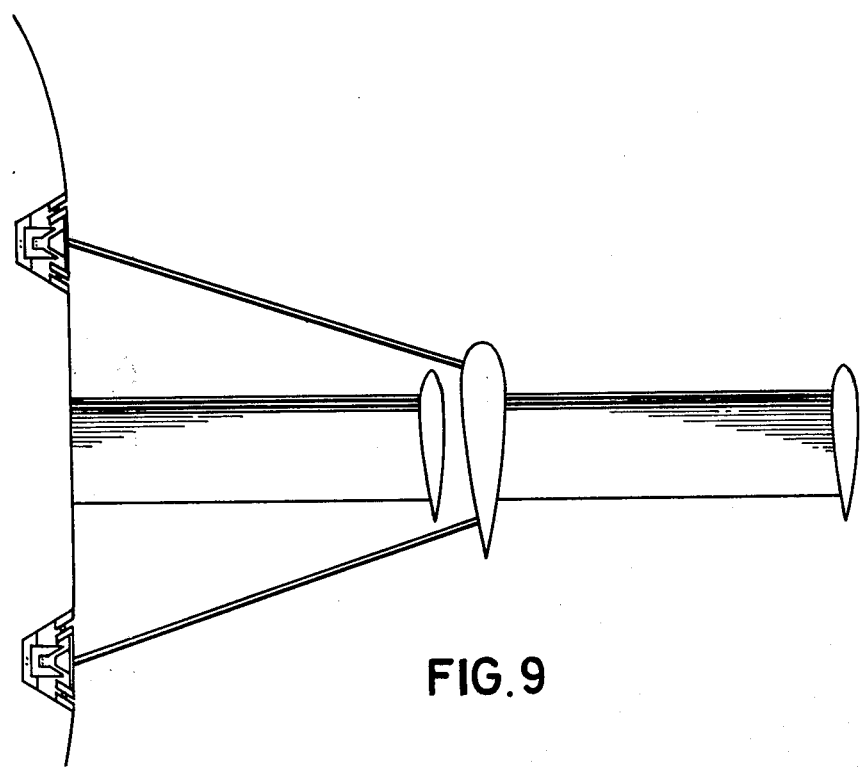
Figure 10:
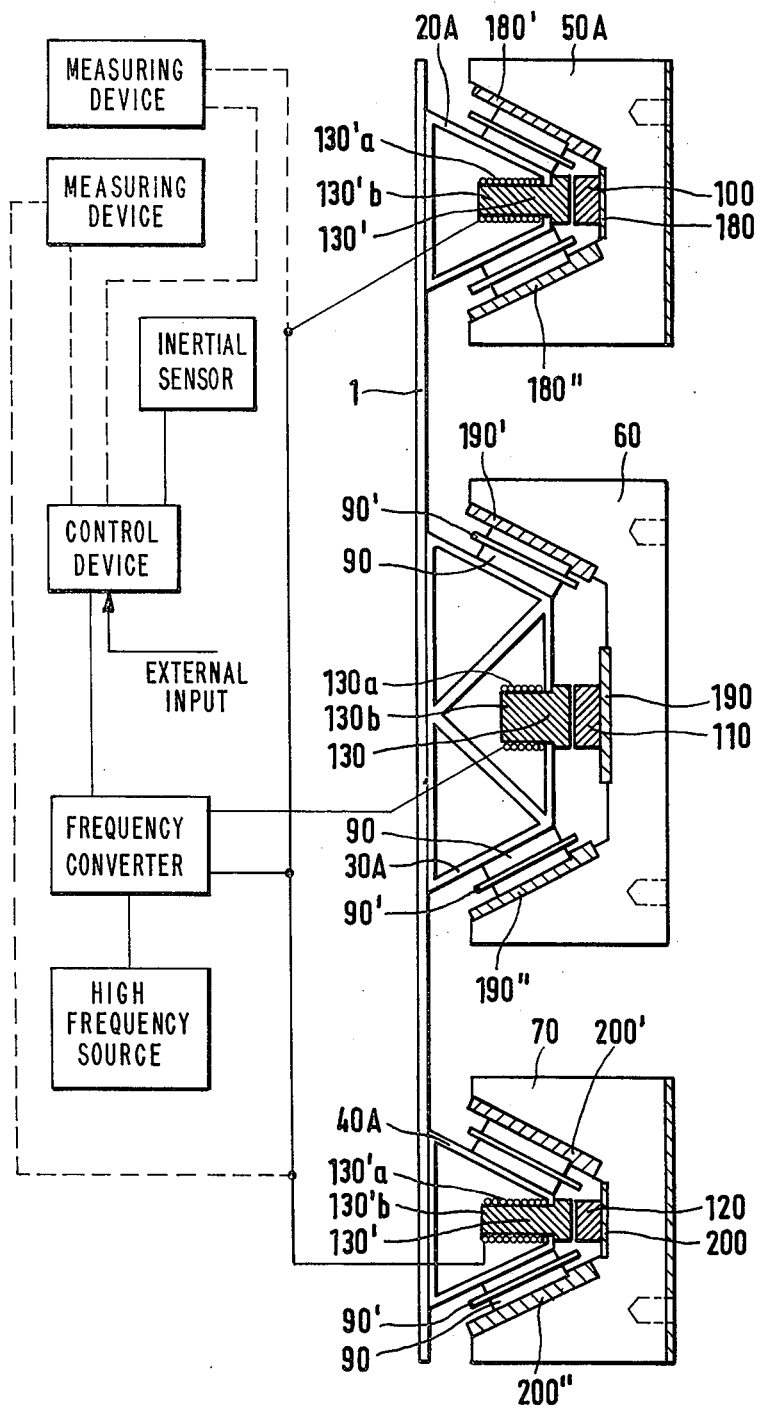
Figure 11:
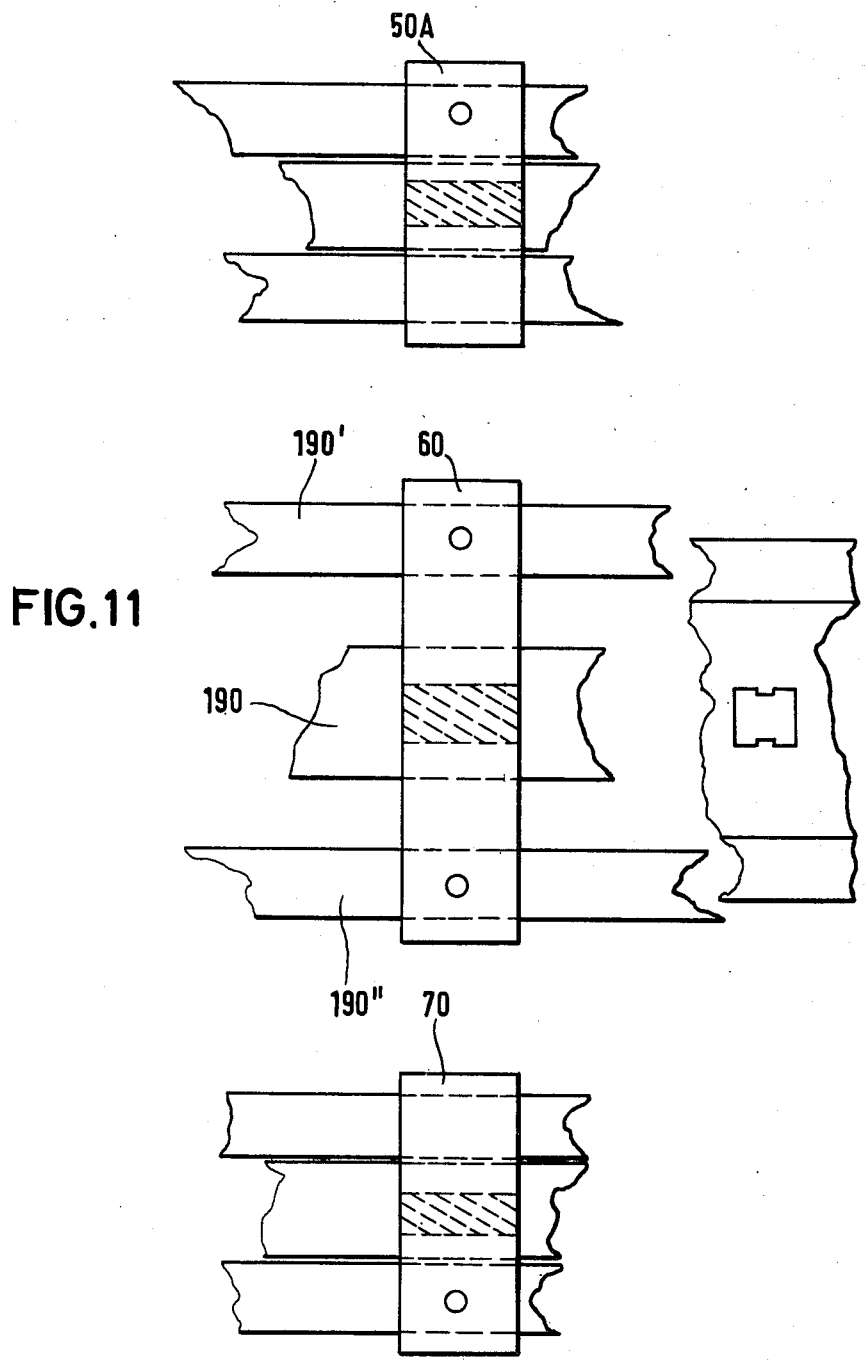
Figure 12:
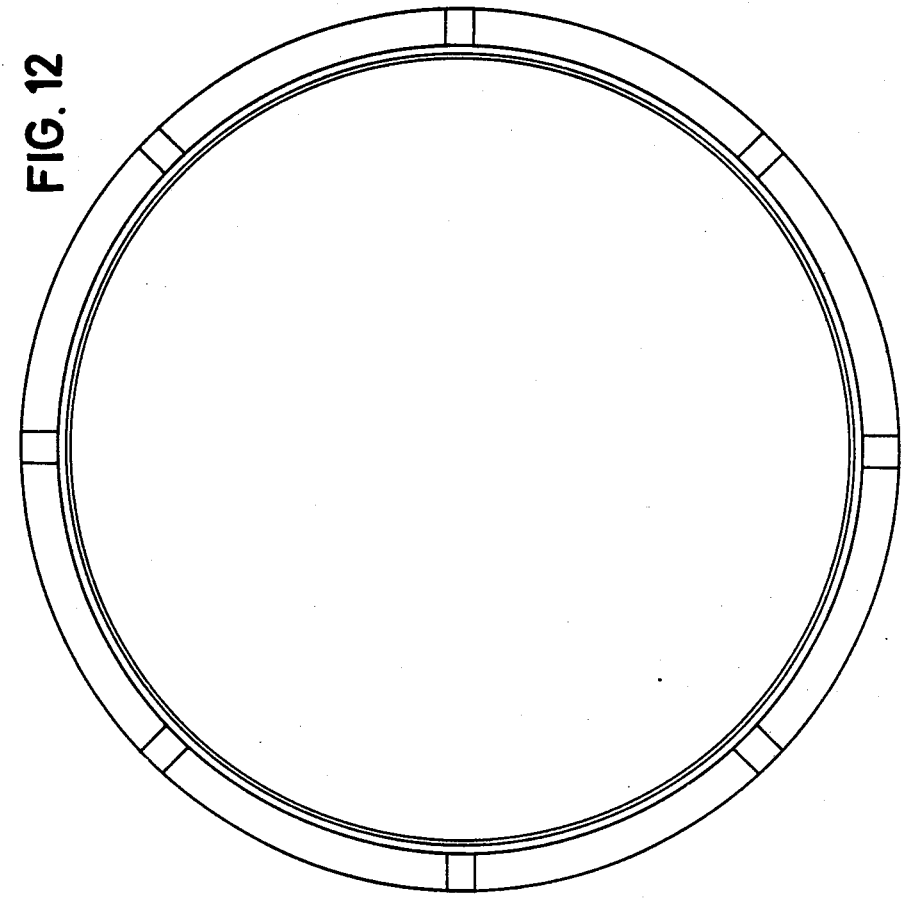
Figure 12A:
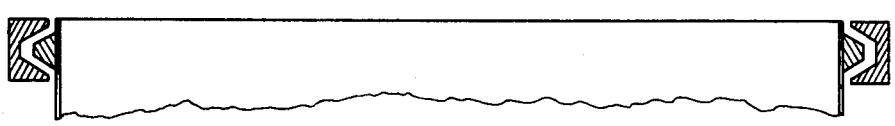
Figure 13:
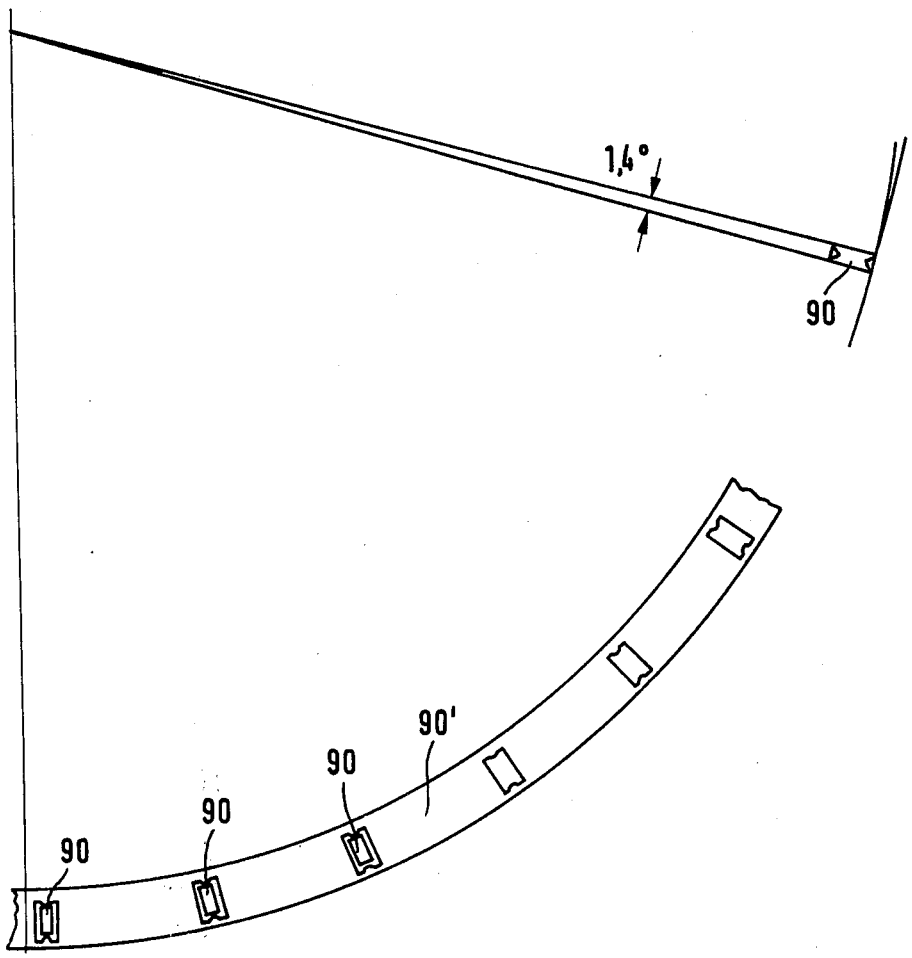
Figure 14:
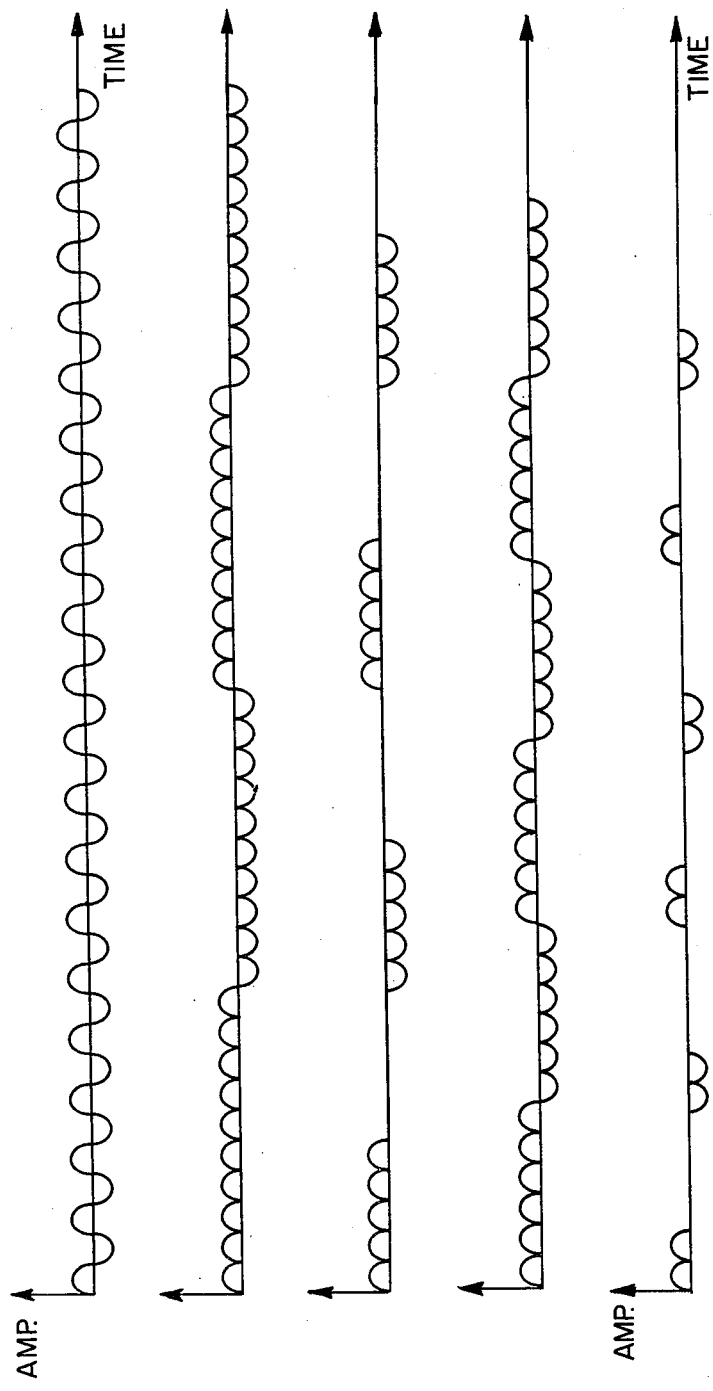
Figure 16:
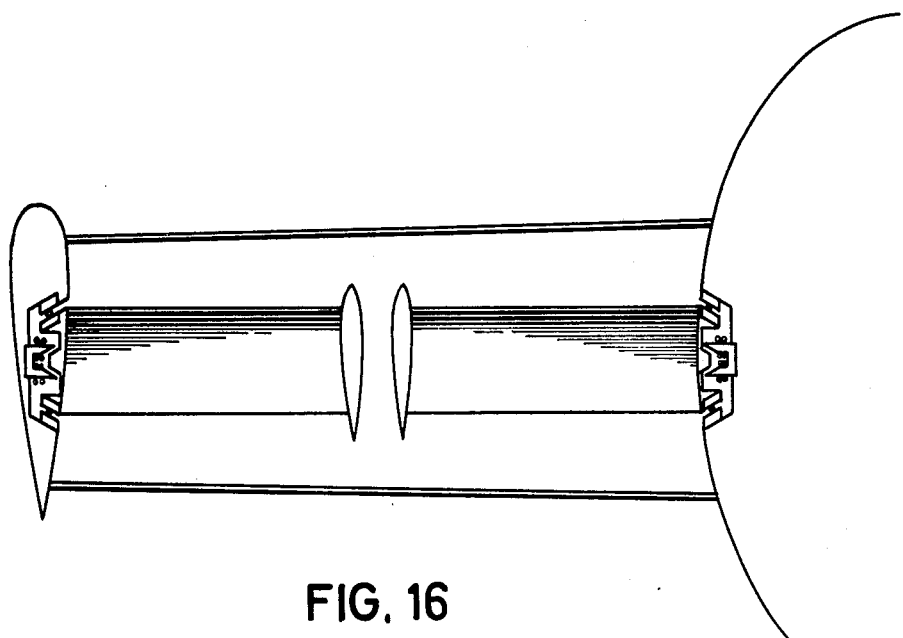
Figure 15:
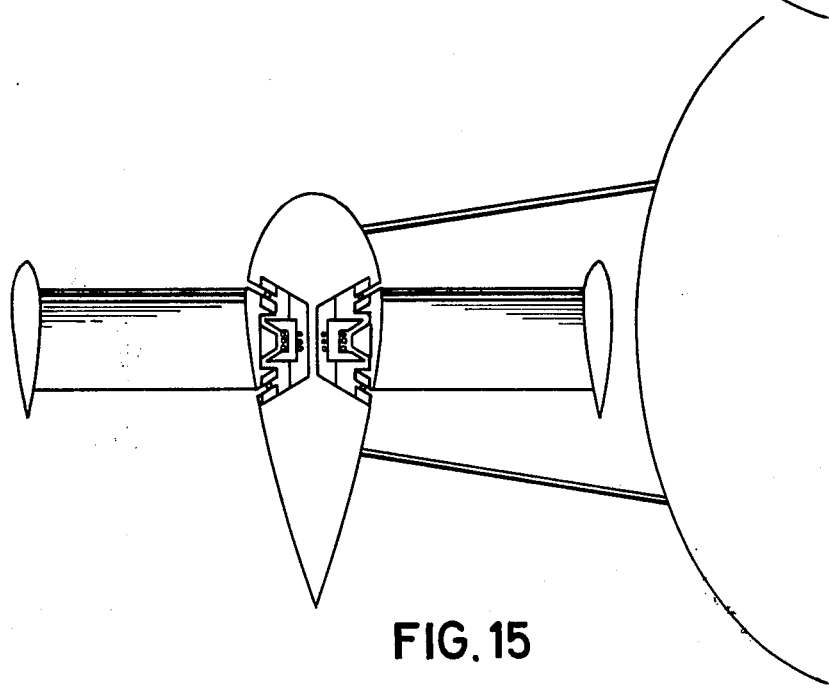
Figure 17:
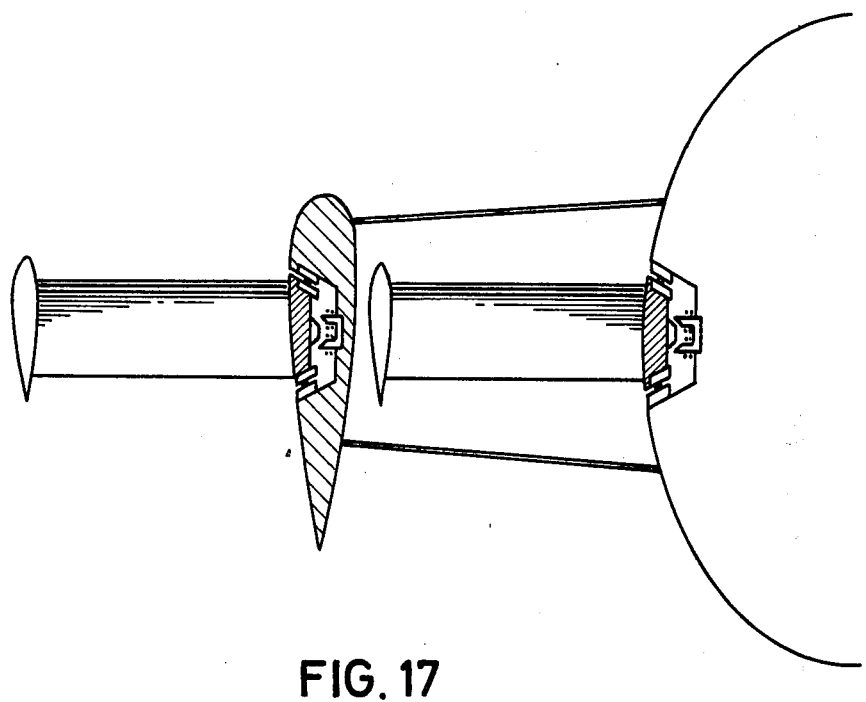
Figure 18:
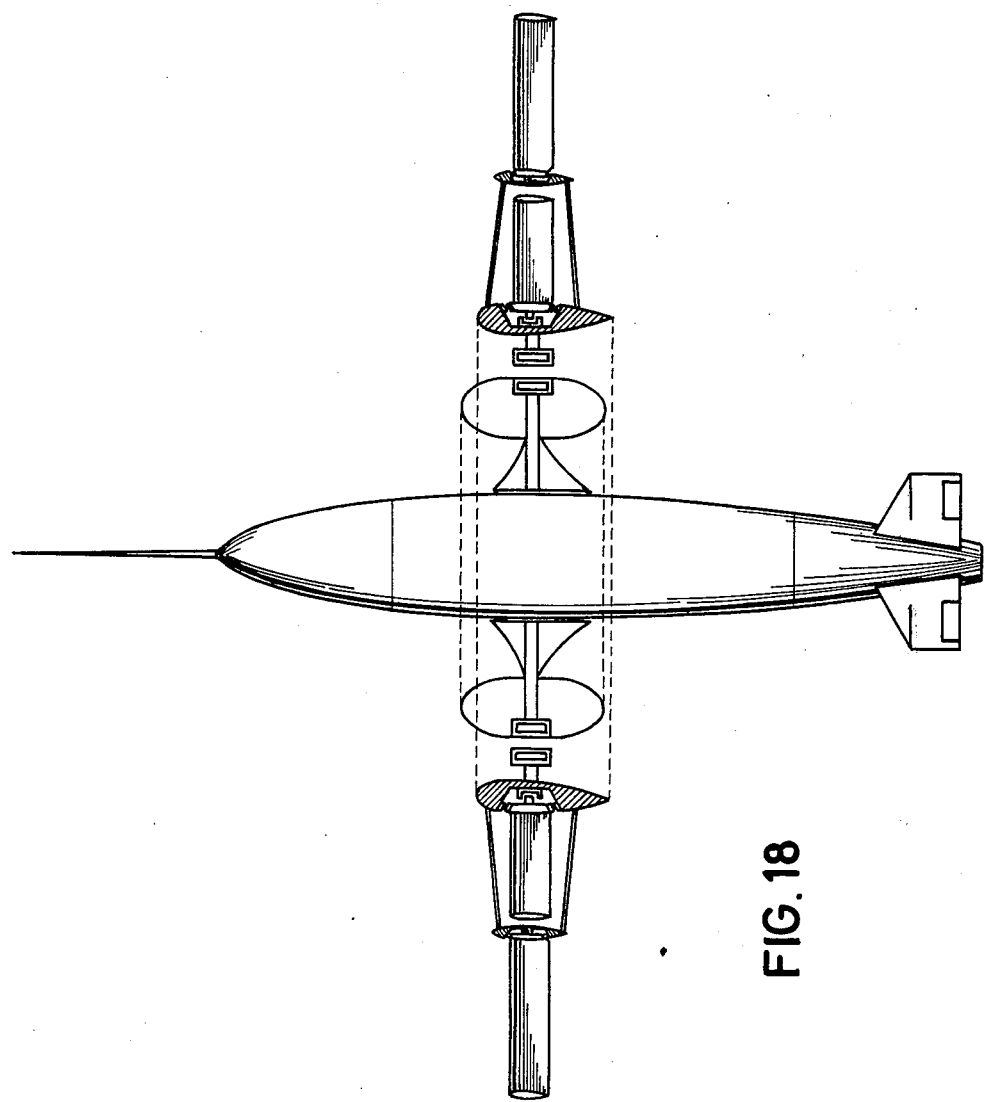

Other features of the inventive rotor means can be seen from the subsequent description and the patent claims. In the following embodiments of the inventive rotor means are described in conjunction with the drawings in which:

FIG. 1 is a partially cross-sectional schematic view of an aircraft comprising an inventive rotor means, FIG. 2 is a cross-sectional view of detail II in FIG. 1 on an enlarged scale for a first embodiment of an inventive rotor means in which the two rotors together form an electromotor, FIG. 3 is a cross-sectional view of a detail of the concentric journaling of two rotors in a second embodiment of the rotor means in which the rotors again form together an electromotor, FIG. 4 is a cross-sectional view of the rotor assembly in a third embodiment of the inventive rotor means in which the rotors again form together an electromotor, FIG. 5 is a cross-sectional view of the rotor assembly in a fourth embodiment of the inventive rotor means in which the rotors again form together an electromotor, FIG. 6 is a cross-sectional view of the rotor assembly in a fifth embodiment of the inventive rotor means in which the rotors again form together an electromotor, FIG. 7 is a cross-sectional view of the rotor assembly in a sixth embodiment of the inventive rotor means in which the rotors again form together an electromotor, FIG. 8 is a cross-sectional view of the rotor assembly in a seventh embodiment of the inventive rotor means, in which the rotors again form together an electromotor, FIG. 9 is a cross-sectional view of the rotor assembly in an eighth embodiment of the inventive rotor means in which the rotors again form together an electromotor, FIG. 10 is a cross-sectional view of detail II in FIG. 1 on an enlarged scale for a ninth embodiment of a construction of an inventive rotor system in which each rotor, together with a respective associated support part component, forms an electromotor respectively, FIG. 11 is a radial view of a cutaway portion of the detail according to FIG. 10 as seen in the direction toward the middle axis of the aircraft, FIGS. 12 and 12A show a top elevation of a rotor race of the rotor means according to FIG. 10, FIG. 13 is a top elevation of a section of a cage with a journal for journaling a rotor in the rotor means according to FIG. 10, FIG. 14 is a circuit diagram of various current pulse trains, FIG. 15 is a cross-sectional view of the rotor assembly in a tenth embodiment of the inventive rotor means in which each rotor, together with a respective associated support part component, forms an electromotor respectively, FIG. 16 is a cross-sectional view of the rotor assembly in an eleventh embodiment of the inventive rotor means in which each rotor, together with a respective associated support part component, forms an electromotor respectively, FIG. 17 is a cross-sectional view of the rotor assembly in a twelfth embodiment of the inventive rotor means in which each rotor, together with a respective associated support part component, forms an electromotor respectively, and FIG. 18 is a partially cross-sectional lateral view of another embodiment of an inventive rotor means which is designed as a launching platform for rockets.

FIG. 1 schematically illustrates an aircraft which exhibits a streamlined shaped shell 31 within which a cabin is hung on Cardanic suspension. The cabin 32 is journaled on a support hoop 33 so as to be pivotable about an axis, said support hoop in turn being pivotally journaled on a hoop 1 rigidly connected to said shell 31 so as to be pivotable about another axis. Two counter-rotating rotors 29 and 30 are journaled on the hoop 1 so as to be freely rotatable about the hoop axis. The shell 31 may also be omitted completely so that only the hoop 1 is left. The cabin 32 is freely accessible from the outside in such a case and may be designed as a platform for carrying loads or instruments for example. In this aircraft, the cabin or platform 32 is thus hung on the rotors 29 and 30 in a Cardanic suspension assembly which includes two support hoops 33 and 1 and has three axes. The cabin or platform thus has a spacial position which is independent of the position of the rotors. Even if the flight attitude of the rotors is changed, the cabin or platform 32 may be maintained in a position which is set once. The aircraft behaves in all flight conditions like a Foucault gyroscope.

As shown in FIG. 1, the cabin 32 has on its upper side a flat platform which can carry persons as well as instruments, for example observation instruments. If a shell 31 is present, observations of the environment may be made from the platform on the upper side of the cabin 32 through openings (not shown) in the shell. If a shell 31 is not present, vision from the cabin 32 is completely unimpeded right from the very beginning. In each case, the rotors 29 and 30 are not obstacles to vision since they extend substantially in only one main plane of the aircraft and leave the area thereabove and therebelow completely free. Such an aircraft may thus be designed readily as what is known as a captive aircraft, lines being attached to the underside of the cabin which lead to a drive and/or control device stationed on the ground. Such a captive aircraft may be supplied with energy and control commands from the ground during every phase of flight and may achieve altitudes and courses which depend on the length of the lines between the ground instruments and the aircraft itself.

It is self-evident that means may be provided in the lower area of the cabin as well for observing the environment through openings (not shown) in the lower area of the shell. For instance, a winch may be secured to the cabin for pulling up objects from below through openings in the shell into the cabin. The rotors 29 and 30 are not disruptive to this operation either, since they also leave the entire lower region of the aircraft free as well.

The rotor means illustrated in FIGS. 1 and 2 includes two counter-rotating rotors comprising rotor blade mounts 29 and 30 which are disposed concentrically to one another in one plane. Each rotor blade mount 29 or 30 is defined both on its inner and outer periphery by an annular wall (duct hoop) respectively. These annular walls improve the air flow in the rotor blade mounts thereby contributing to a substantial improvement in the efficiency of the rotors.

The structural element on which the rotors are rotatably journaled and which is connected to the shell 31 is designed as a support hoop 1. The support hoop 1 has on its outer periphery projections 2, 3 and 4 which extend thereabouts and which form paths for the runners 5, 6 and 7 of the two rotors (FIG. 2). The inner rotor together with the rotor mount 29 includes on its inner periphery a number of runners 6 in the shape of circular arc segments which are evenly distributed about the inner periphery. These runners have a substantially U-shaped cross-section with V-shaped sides (FIG. 2). The runners 6 are surrounded by a loop 19 shaped like a barrel hoop. Rollers 9 are positioned between the projection 3 and the sides of the runners 6 which are journaled on said runners 6 by means of ball bearings and which roll on the paths of the projection 3. This journaling ensures that the friction between the runners 6 and the projection 3 is kept at a minimum. The rotor blades of the rotor blade mount 29 are secured on the outer periphery of the loop 19, which holds the runners 6 together, and extend radially in an outward direction (FIG. 1). The rotor blades have been omitted in FIG. 2 for reasons of clarity.

Runners 5 and 7 are provided above and below the runners 6 of the inner rotor, said runners 5 and 7 also being journaled by means of ball bearing rollers 9 on projections 2 and 4 extending about the periphery of the support hoop 1 in the manner already described in conjunction with the runners 6. Both the runners 5 as well as runners 7 constitute circular arc segments which are evenly distributed about the periphery of the support hoop 1 and which are held together by a hoop 18 or 20 respectively. Stays 27 and 28 are secured to the hoops 18 and 20 and extend outwardly above and below the inner rotor mount 29 and are secured to the inner periphery of the outer rotor mount 30 connecting this to the runners 5 and 7 (cf FIGS. 1 and 2). This construction produces a rotor means having two counter-rotating concentric rotors which are disposed in one plane and which extend across a very considerable diameter, the height of the rotor means being very low and the two half spaces above and below the rotor means remaining completely free.

Rings 21 which surround the support hoop 1 are secured to the undersides of the runners 5 and to the upper sides of the runners 7. Rings 22 are also secured to the surfaces of the runners 6, i.e., the upper and lower sides, which lie opposite to these rings. A plurality of electromotor poles is secured to each of the rings 21 and 22 respectively so that they are evenly distributed about the periphery of said rings. Such poles 10 are mounted on the underside of the runners 5. Poles 11 are secured to the opposing upper side of the runner 6. Poles 12 are attached to the underside of the runner 6 and poles 13 are fixed to the upper side of the runner 7 lying opposite thereto. The same number of poles 10, 11, 12 or 13 is secured to all four rings 21 or 22 respectively. Each pole consists of a cylindrical iron core 10b, 11b, 12b or 13b and an electrical conductor coil 10a, 11a, 12a and 13a wound therearound. The conductor coils of the poles are connected to sliding contacts which are not shown for reasons of clarity and which in turn abut and slide on conductor bands surrounding the support hoop 1. A few of these bands are illustrated in FIG. 2 more clearly and are designated by reference numerals 23, 24 and 25. The slipping contacts associated with the respective poles are secured to the respective runners 5, 6 or 7. Reference is made to the fact that due to reasons of clarity, not only have the slipping contacts been omitted in FIG. 2, but a number of the conductor bands were also omitted for the same reason. Conductor rings must be visualized as being adjacent all runners.

The opposing pole groups 10 on the runners 5 and 11 on runners 6 constitute the poles of an electromotor, the runners 5, held together by the hoop 18, comprise a ring unit which rotates when a suitable high frequency current is applied to the poles according to the rotary field produced in the poles relative to the runners 6 which are held together by the hoop 19 and which also comprise a closed ring unit. The opposing poles 10 and 11 on the runners 5 and 6 thus form an electromotor.

The same applies for the poles 12 secured to the underside of the runners 6 and for the poles 13 secured to the upper side of runners 7. Since runners 5 and 7 are connected to the outer rotor and runners 6 to the inner rotor and the movement of the runners 5 must take place in the same sense as the movement of runners 7 and relative to the movement of the runners 6, the respective opposite poles 11 and 12 of runners 6 are connected in parallel. Likewise, the tiered poles 10 and 13 of runners 5 and 7 are connected in parallel as well. Now, if a polyphase AC current, e.g. a three-phase current, is conducted from a power source arranged in the interior of the cabin but not illustrated for reasons of clarity via conductors not shown for reasons of clarity to the conductor bands 23, 23, 25 and from there to poles 10, 11, 12 and 13, the runners 5 and 7 will rotate in common relative to the runners 6 and in opposite direction relative to their sense of rotation due to the rotary fields produced between poles 10 and 11 and 13 and 12. The runners 5 and 7 rotate in common about the support hoop 1 while the runners 6 rotate about the support hoop 1 in the opposite sense. Since the rotating magnetic fields between the poles only act on the runners 5 and 7 or 6 functioning as stators or rotors, no torque is transmitted to the support hoop 1 by the runners with the exception of the low frictional torque which is produced by the rollers 9.

In order to compensate for the aforecited low frictional couple and to be able to prevent rotation of the support hoop 1, two magnets, each of which is designed as a coil 14 or 15 wound around a core 16 or 17 (FIG. 2), are provided on the outer periphery of the support hoop 1. Each of the coils 14 or 15 is connectable to a power source. The coil 14 extends adjacent the path of rotation of the pole 12 whereas the coil 15 extends adjacent the path of rotation of the pole 13. Each of the coils is disposed such that a magnetic field is produced therein when the current is applied. This magnetic field acts on the respective adjoining pole and produces a magnetic lock. For instance, if coil 14 is activated, a magnetic lock is produced between the poles 12 and the coil 14, thereby causing the support hoop 1 to rotate in the same sense of rotation as the runners 6. If however coil 15 is activated, poles 13 are magnetically locked, thereby causing the support hoop 1 to rotate in the same sense as runners 7. In this manner, not only low frictional couples occurring on the support hoop 1 may be compensated for, but it is also possible to rotate the support hoop 1 selectively into a desired position.

The number of poles 10 or 11 or 12 or 13 respectively disposed in one annular plane is not illustrated in FIGS. 1 and 2. The figures however readily show that a large number of poles may be accommodated on each ring 21 or 22 along the ring periphery. It is possible in this rotor means and may be advantageous in many cases to have a considerably greater number of poles in each annular circular plane than the number of poles in the power source which is located in the cabin 32. Assuming for example that a three-phase current generator which produces a three-phase current serves as the power source, the number of poles in the three-phase current generator may be relatively small. By contrast, the number of poles 10 or 11 or 12 or 13 may be a whole multiple of the poles of the generator, successive poles being respectively connected electrically to successive current phases of the current issuing from the generator. A rotary field is produced in this way in the connected poles by the rapidly rotating three-phase current generator, said field rotating more slowly by a multiple, thereby resulting in a gear-less reduction in the rotational speed between the current generator and the rotors.

In the aforecited embodiment, it is possible for example that the three-phase current generator has only a low number of poles and rotates at a high speed corresponding to a favorable operational speed of turbines or high-speed of turbines or high-speed reciprocating piston-type internal combustion engines so that it is possible to couple the current generator directly to such an engine. The speed supplied to the rotors is then reduced by disposing on the rotors a considerably greater number of poles which are supplied by the current phase outputs of the current generator. Since the speed of an electromotor constructed in this manner is proportional to the frequency of the supply current and inversely proportional to the number of poles, a favorable gear-less reduction in the speed of the rotors is accomplished in the case of high-speed current generators.

It is not absolutely necessary that a generator which produces polyphase AC voltage, e.g. three-phase current, be used as the power source. A DC source may also be used for example which is connected upstream of a converter unit in which the DC voltage is electronically converted into polyphase AC voltage. The poles are coupled in groups to the various outputs of the converter in this case.

The invention is not limited to the cited examples. For instance, a closed hoop may be provided in place of a number of runners 5, 6 or 7 positioned about the support hoop 1. It is also possible to design only poles 11 and 12 of the inner rotor as electrically actuatable magnets and the opposite poles 10 and 13 of the outer rotor as permanent magnets. To produce the required current to feed the poles, a high frequency generator may be employed which is directly connected to a gas turbine. Such high frequency generators are already in use in airplane construction, e.g. to produce a current of 400 cps at 600 o/rpm, and have a low power-to-weight ratio which is extremely favorable.

It is also possible for example to construct an inventive rotor means such that each rotor is not provided with two rows or poles 11 and 12 or 10 and 13 as in the embodiment described with reference to FIGS. 1 and 2, but rather only with one row of poles, the poles of the rows of poles of both rotors lying opposite one another such that their magnetic fields interact.

FIG. 3 illustrates schematically a cross-section through the point of connection of two rotor mounts on the support hoop of an aircraft. The sectioned area corresponds approximately to the region II in FIG. 1, but the illustrated construction differs from the one shown in FIG. 1. In the air-craft according to FIG. 3, the rotor blade mounts of two counter-rotating rotors are disposed concentrically to one another. The rotor blades 34 of the inner rotor are secured to a support hoop 35 which concentrically surrounds the support hoop 36 of the outer rotor. Upper stays 37 are secured to the upper edge of the support hoop 36 of the outer rotor which projects beyond said support hoop 35 and stays 38 are secured to the lower edge which projects downwardly beneath the support hoop 35. An outer rotor blade mount (not shown) is mounted on these upper and lower stays 37 and 38 analogously to the stay structure shown in FIG. 1 with stays 27 and 28. The support hoop 36 of the outer rotor concentrically surrounds a support member 39 which is also designed as a hoop and which may be attached either to the fuselage of an aircraft or to an outer support hoop of a triaxial Cardanic suspension for the cabin of an aircraft. The support member 39 may assume the position of the support means 1 in FIG. 1 for example.

In the embodiment according to FIG. 3, the support hoop 35 of the inner rotor supports permanent magnet poles 40 on the side facing the support hoop 36 of the outer rotor. The support hoop 36 of the outer rotor supports U-shaped magnetic cores 41 which are wound with coils 42, which are distributed about the periphery and which lie opposite the magnetic poles 40 of the support hoop 35. The individual units 41, 42 form electromagnetic poles whose fields cooperate with the permanent magnets 40. By applying correspondingly regulated currents to the pole units 41, 42 in the aforecited manner, a rotary field may be produced which causes the outer rotor, together with the inner rotor, to form an electromotor and the two rotors are driven in counter-rotation due to the action of the rotary field. The behavior and the mode of operation of such an electromotor drive have already been explained in conjunction with the embodiment according to FIG. 2 so that reference is made to those statements.

In the embodiment according to FIG. 3, the support hoops of the rotors are not journaled by means of ball or roller bearings as in the embodiment according to FIG. 2, but rather by means of magnetic bearings shown in a highly schematical and simplified manner and are designated by numbers 43', 43'', 44', 44'', 45', 45'', 46' and 46''.

FIG. 4 shows a detailed cross-sectional elevation through another embodiment of the invention. In this embodiment, two coaxial support hoops 47 and 48, which surround a fuselage (not shown for reasons of clarity) in radial spaced relation, are provided in axial spaced relation from one another, each of which is connected by means of a plurality of stays 49 and 50 to the fuselage or to a support structure journaled thereto. The stays 49 and 50 may, for example, also be fastened to the outer one of two cardan hoops (1.33) which, together with respective bearings, belong to a 3-axial cardan suspension supporting a cell (as shown schematically in FIG. 1). An inner rotor 51 is rotatably journaled to these support hoops such that its rotor blades extend inwardly in a radial fashion and an outer rotor 52 is rotatably journaled such that its rotor blades extend outwardly in a radial fashion. The inner rotor supports a plurality of permanent magnet poles which face electromagnetically controlled poles secured to the outer rotor. The pole structure is similar to the one shown in FIG. 3. Furthermore, in the embodiment according to FIG. 4, the inner rotor 51 and the outer rotor 52 together form an electromotor and rotate in opposite senses.

In the embodiment according to FIG. 4, both rotors are journaled on the support hoops by suitable bearings so as to reduce the friction. In this embodiment, the current supply to the electromagnetic poles of the outer rotor may be effected via lead wires which issue from the fuselage via the stays 49 and 50 and via slip rings (not shown) which conduct the current to the magnetic poles of the outer rotor.

FIG. 5 is a partial section of another embodiment of an inventive rotor means, partially in cross-section, in which the rotor mounts are again disposed concentrically to one another in one plane. The inner rotor is rotatably journaled on a schematically illustrated fuselage of an aircraft on the inner periphery of said inner rotor by means of a suitable bearing which is also illustrated schematically. On the outer periphery of the inner rotor there is secured a duct hoop which extends about the rotor and which serves to improve the air flow conditions in the inner rotor as well as simultaneously functioning as a support hoop on which the outer rotor is rotatably journaled by means of a suitable bearing. Outwardly directed electromagnetic poles are disposed on the support duct hoop of the inner rotor distributed equidistantly about the periphery thereof. These poles lie opposite poles of permanent magnets on the inner circumference of the inner hoop of the outer rotor. The two rotors together form an electromotor and rotate in opposite senses. The current is supplied to the poles of the inner rotor via slip contacts (not shown) between the inner rotor and the fuselage. The control currents may originate from a power source in the fuselage or from a stationary ground station via the captive line. In this embodiment, the fuselage, which bears and supports the rotors, does not rotate together with them.

Another embodiment of the inventive rotor means is illustrated in partial elevation, partially in cross-section, in FIG. 6. The construction of this rotor means corresponds substantially to the construction of the means according to FIG. 5. In addition, however, there is provided adjacent the inner circumference of the inner rotor a device which makes it possible to change and regulate during flight the position of the fuselage which is provided within the rotors. To this end, permanent magnets are provided on the inner periphery of the inner rotor. On the opposite outer periphery of the fuselage or of a support member connected thereto, schematically illustrated electromagnetic poles are provided which may be supplied with currents originating from a control device. This assembly functions as an electromotor or, expressed somewhat better, a rotary device when control currents are introduced. This rotary device makes it possible to rotate the fuselage if necessary by a controllable amount relative to the inner rotor in order to adjust the fuselage to a specific position during flight. The device may also be employed to compensate for the frictional losses between the inner rotor and the fuselage which may be produced, for example, due to contact friction of the slip contacts for conducting the control currents for the poles on the outer circumference of the inner rotor.

Another embodiment of an inventive rotor means is illustrated in FIG. 7 in partial elevation, partially in cross-section. In this embodiment, the inner rotor is rigidly mounted on a fuselage of an aircraft, whereas the outer rotor is journaled to rotate freely in a suitable bearing on the outer periphery of the inner rotor in the manner already described with respect to the rotor means according to FIGS. 5 and 6. On the outer periphery of the inner rotor, electrically controllable magnet poles are arranged and opposed by poles of permanent magnets situated on the inner periphery of the outer rotor. In this embodiment of the rotor means, the two rotors together form an electromotor and rotate in opposite senses, the fuselage of the aircraft rotating together with the inner rotor in this case. This embodiment is suitable, for example, for unmanned aircraft, e.g. captive observation platforms, aircraft for raising loads and the like. A constructive advantage of this means is that the electric leads for the control currents of the magnet poles do not have to be conducted to the inner rotor via slip contacts, but may be supplied via the rotor blades which are rigidly secured to the fuselage.

Two further embodiments of inventive rotor means are shown in FIGS. 8 and 9 in partial elevation, partially in cross-section. In both embodiments, the inner rotor and the outer rotor are provided concentrical to one another and in one plane. The inner rotor is journaled or secured to the fuselage. The outer rotor is secured or journaled to the fuselage via stays which project above and below the inner rotor. In the embodiment according to FIG. 8, electrically controllable magnet poles are provided on the outer periphery of the fuselage and are opposed by permanent magnet poles on the inner periphery of the inner rotor. In this embodiment as well, the inner rotor together with the outer rotor mutually form an electromotor because the outer rotor is rigidly connected to the fuselage, thereby forming a unit therewith, which rotates as a unit whereas the inner rotor rotates in the opposite sense. In the embodiment according to FIG. 9, the inner ends of the stays supporting the outer rotor are secured to the hoops which surround the fuselage and which support permanent magnets on their inner peripheries. These permanent magnets lie opposite electrically controllable magnet poles which are mounted on the fuselage. In this embodiment, the inner rotor forms a unit together with the fuselage which rotates mutually as a unit. The inner and outer rotors together form an electromotor in this case as well.

FIG. 10 illustrates an embodiment of an inventive rotor means in partial elevation in cross section, in which each rotor forms an electromotor together with the respectively associated support member component. This rotor means may be employed in an aircraft as illustrated in FIG. 1. The partial elevation in FIG. 10 is a view of the area designated as II in FIG. 1 (although rotated by 180°, i.e. as seen on the diametrically opposed location of the aircraft fuselage). If components of the aircraft illustrated in FIG. 1 are mentioned in the following description, the reference numerals employed in FIG. 1 will be retained. In the embodiment shown in FIG. 10, the structural element which is provided with the shell 31 and upon which the rotors are rotatably journaled, is designed as a support hoop 1. As was already emphasized in the embodiment according to FIGS. 1 and 2, the shell 31 may also be completely absent. The support hoop 1 is then completely exposed as a structural element. On its periphery, the support hoop 1 includes projections 20A, 30A, and 40A which encompass said hoop and which forms paths for the runners 50A, 60 and 70 of the two rotors (FIGS. 10 and 11). The inner rotor together with the rotor mount 29 has on its inner periphery a plurality of runners 60 which are uniformly distributed about the inner periphery and which have a substantially U-shaped cross section with V-shaped sides (FIG. 2). The runners 60 are connected by hoops 190, 190' and 190''which resemble barrel hoops. Between the projection 30A and the hoops 190' and 190'', which concomitantly serve as paths, there are arranged rollers 90 wich are journaled in the respective surrounding cages 90' so as to be freely rotatable and roll on the paths formed by the projection 30A and the hoops 190' and 190''. This journaling maintains the running friction between the hoops 190' and 190'' and the projection 30A at a minimum. The rotor blades of the rotor blade mount 29 are mounted on the outer surfaces of the runners 60 and extend outwardly in a radial fashion (FIG. 1). The rotor blades have been omitted in FIGS. 10 and 11 for reasons of clarity.

Runners 50A and 70 are provided above and below the runners 60 of the inner rotor and are also journaled by means of rollers 90 journaled in cages 90' on projections 20A and 40A extending about the periphery of the support hoop in the manner already described hereinbefore in conjunction with the runners 60. Both the runners 50A as well as runners 70 constitute elements which are evenly distributed about the periphery of the support hoop and which are held together by loop-like hoops 180, 180' and 180'' or 200, 200' and 200''. Stays 27 or 28 are secured to the runners 50A and 70 and extend outwardly above and below the inner rotor mount 29, and are secured to the inner periphery of the outer rotor mount 30 and connect the latter to the runners 50A and 70 (cf. FIGS. 1 and 10). This construction produces a rotor means having two counterrotating concentric rotors which are disposed in one plane and which extend across a very considerable diameter, the height of the rotor system being very low and the two half spaces above and below the rotor system remaining completely free.

A plurality of electromotor poles are mounted evenly distributed around the periphery of the hoops on the radial inner sides of the hoops 190 and 180 and 200 of the rotors 29 and 30 respectively. Poles 100 are secured to the hoop 180. Poles 110 are secured to the hoop 190. Poles 120 are secured to the hoop 200. There is mounted on all hoops respectively the same number of poles 100, 110, or 120. Each of these poles consists of a block of magnetic material and is constructed as a permanent magnet Poles 130' or 130 which are respectively distributed on the radial outer surface opposite the hoops 180, 200 or 190 around the respective periphery in uniform spaced relations, are secured to the projections 20A, 30A or 40A which form components of the support hoop 1. Each of the poles consists of a core 130'b or 130b of a magnetizable material, e.g. iron, and an electrical conductor coil 130'a or 130a wound thereabouts. The conductor coils 130'a or 130a of the poles are firmly connected electrically to leads which are not shown for reasons of clarity, said leads running to a control means which in turn is connected to a power source. The control means and the power source may be symmetrically distributed according to weight, for example, at diametrically opposite positions on the inner side of the support hoop 1, e.g. at positions at which the support hoop 33 is journaled on the support hoop 1 via pivotal axles. It is also possible, for example, to arrange the power source and the control means in the cabin 32 and to connect them to the support hoop 1 via the support hoop 33. Furthermore, it is also possible to design the power source and the control means external to the aircraft as a ground means and to couple them to the support hoop 1 via leads.

The opposing groups of poles 100 on the runners 50A and 130' on the projection 20A constitute the poles of an electromotor, the poles 130' on the projection 20A representing the stator while the runners 50A, held together by the hoops 180, 180' and 180" constitute a ring unit which supports the poles 100 which, when the poles 130' are connected to a suitable high-frequency current, rotate relative to the poles 130' depending on the rotary field produced in these poles. The permanent magnet poles 100 thus form a rotor which together with the stator formed by the poles 130', form an electromotor.

The same applies for the opposite groups of poles 110 and 130 as well as 120 and 130'. The poles 110 form a rotor which, together with the stator formed by poles 130, constitute an electromotor. The poles 120 form a rotor which, together with the poles 130' on projection 40A, which acts as a stator, constitute an electromotor.

Since the runners 50A and 70 are connected to the outer rotor blade mount and the runners 60 are connected to the inner rotor blade mount and the rotation of the runners 50A must therefore be in the same sense and at the same speed as the rotation of the runners 70 and in the sense opposite to the rotation of the runners 60, the poles 130' on the projections 20A and 40A are connected in parallel. These poles are supplied by a power source (not shown) via a control means (not shown). The poles 130 on the projection 30A are switched irrespectively of the aforecited poles and are supplied separately from these by the control means (not shown for reasons of clarity) and the power source (not shown either for reasons of clarity). If a polyphase AC voltage e.g. a three-phase current, is fed to the control means from the power source via lines (not shown for reasons of clarity) and separate current pulses are conducted from this power source via lines to the coils 130a of the pole 130 on the (not shown) other hand, the runners 50A and 70 will then begin to rotate due to the rotary fields occurring between the poles 130' and 100 or 120 and the runners 60 will begin to rotate due to the rotary fields produced between the poles 130 and 110. By means of the control means, the current pulses supplied to the poles 130' and the current pulses supplied to the coils 130 are regulated such that the runners 50A and 70 rotate in a sense opposite to the runners 60. The runners 50A and 70 then rotate in common about the support hoop 1 in one sense while the runners 60 rotate about the support ring 1 in the opposite sense.

In order to compensate for the torques of the counter-rotating rotor blade mounts 29 and 30, the current pulse supplies to the coils 130' and 130 are regulated by the control means such that the torques of the counter-rotating rotors are compensated for.

Furthermore, any and all occurring frictional torques, which could be produced by the rollers 90 for example, are compensated for rapidly and exactly be corresponding individual control of the current pulse supply to the coils 130' and 130a. By means of such control, which makes it possible to drive and control the rotor 30 independently of rotor 29, it is also possible to consciously produce the pulse changes of the rotor system and thus to intentionally produce a torque whether to rotate the support hoop 1 together with the support hoop 33 journaled thereon and the cabin or platform 32 in a desired sense or to maintain the same in a specific orientation (flight direction).

The number of poles 100 or 110 or 120 or 130 or 130' respectively arranged in a ring plane is not shown in FIGS. 1, 10 and 11. These figures, however, readily reveal that a large number of poles may be accommodated along the periphery on each hoop 180, 190 or 200 and on each projection 20A, 30A or 40A. In this rotor means, it is possible and in many cases advantageous to keep the number of poles in each plane considerably larger than the number of poles of the power source. Assuming for example that a three-phase generator which produces a three-phase current serves as the power source. The number of poles in the three-phase generator may be relatively small. By contrast, the number of poles 130 or 130' respectively constitute a whole multiple of the poles of the generator, successive poles being electrically connected to successive voltage phases of the current issuing from the generator. In this way, a rotary field is produced in the connected poles due to the rapidly rotating three-phase generator; this rotary field however rotates slower by a multiple, thereby resulting in a gear-less reduction of the rotational speed between the current generator and the rotors.

In the aforecited embodiment, it is also possible for instance that the current generator only has a small number of poles and rotates at a high speed corresponding to a favorable operational speed for turbines or high-speed reciprocating piston-type internal combustion engines so that it is possible to couple the current generator directly to such an engine. The speed reduction to the rotors is then achieved in that a considerably larger number of poles 130', 130 or 130' is positioned on the projections 20A, 30A or 40A respectively. These poles are supplied by the voltage phase outputs of the current generator (in so doing, however, control must be accomplished by means of the control means such that a rotary field rotating in an opposite sense relative to the poles 130' is produced in the poles 130). Since the speed of each electromotor constructed in this way is proportional to the frequency of the supply current and inversely proportion to the number of poles, a favorable gear-less reduction of the speed can also be attained with respect to the rotors using a high-speed current generator.

It is not abslutely necessary that a generator which produces polyphase AC voltage, e.g. three-phase current, be used as the power source. A DC source may also be used for example which is connected upstream of a converter unit in which the DC voltage is electronically or mechanically converted into single phase AC voltage. The poles are coupled to the outputs of the converter in this case.

A top elevation of a ring assembly of runners, for example runners 50A, is illustrated in FIGS. 12, and 12A. A pole 100 is mounted on each of the runners and is not shown in the drawing. In the embodiment illustrated in FIG. 12 and 12A, therefore, only a relatively small number of eight poles is distributed about the periphery. Even with such a small number of poles, a uniform rotor rotation can be produced when correspondingly regulating the current pulses supplied to the coils.

A very favorable possibility of regulating the rotor means is illustrated schematically in FIG. 14. A high frequency current is illustrated in the uppermost line of the diagram according to FIG. 14 which is generated by means of a high frequency generator and is supposed to be employed to drive the rotor means. This high frequency current is supplied to a control means in which it may be subdivided into sequences of current pulses having the same sign. The control means may operate such that it produces in regular intervals of equal time duration pulse trains of one sign in succession and thereafter pulse trains of the opposite sign and then pulse trains of the first sign again as is shown by way of example in lines 2 and 4 of FIG. 14. According to the length of the time interval in which pulses of the same sign are produced, the frequency of an "AC voltage" produced in this manner can be controlled in the control means. If this current is then supplied to poles 130' or 130, one is in a position to control the speed of the respective rotor by selecting the frequency. The control means may also operate such that a specific number of the generated current pulses is suppressed within each interval. This is illustrated by way of example in lines 3 and 5 of FIG. 14. The amount of current supplied to the poles can thus be controlled and regulated. Such a current control and supply must be executed separately for the poles 130' and poles 130 of course, since the rotors respectively driven by these poles must be driven in counter-rotation and must be controlled.

A measuring instrument may be provided in the rotor means and may include, for example, gyroscopic sensors or inertial sensors or electric sensors which ascertain the energy and supply current frequency necessary for each rotor in response to the desired orientation of the cabin and which influence the control means.

It is also possible to design the control means such that it is controlled in response to a feedback of the currents which are produced by the relative movement of the poles 100, 110 or 120 of the rotors with respect to the associated poles 130', 130 or 130' of the projections 20A or 30A or 40A in the coils 130'a, 130a or 130'a of the poles 130' or 130. In this way the energy supply and the frequency of the currents may be controlled which are fed to the pole coils from the power source via the control means. By means of this feedback control, the exact time can also be determined in which the corresponding pulses must be fed to the coils of the poles 130' or 130. Hence, it is possible to automatically regulate and control the rotor means at every rotational speed by controlling the suitable frequency and pulse train duration.

FIG. 13 illustrates a section of a cage rine 90' for mounting the rollers 90. It is obvious that each of the rollers 90 is journaled in its axle so as to be rotatable in the cage 90'.

The invention is not limited to the examples cited. For instance, a closed runner ring may be provided respectively in place of a plurality of runners 50A, 60 or 70 which are arranged about the support hoop 1. In order to generate the required current to feed the poles, a high frequency generator may be employed which is directly coupled to a gas turbine. Such high frequency generators are already in use in airplane construction engineering, for example, to produce a current of 400 cps at 6000 rpm and have a high power-to-weight ratio which is extremely favorable.

FIGS. 15 to 18 show other embodiments of the inventive rotor means in partial elevation in cross section in which each rotor respectively forms an electromotor together with an associated support member. The two electromotors are controlled analogously to the manner described with reference to the embodiment according to FIGS. 10 to 14.

In these embodiments a duct hoop surrounding the fuselage in spaced relation is provided which is connected by means of a number of stays disposed in two spaced tiers to the fuselage or a support construction journaled thereupon. This duct hoop serves as a support member on which at least the outer rotor is rotatably journaled. A suitable bearing is provided in the embodiments according to FIGS. 15 to 17. Electrically controllable magnet poles are mounted on the duct hoop and are opposed by permanent magnet poles arranged on the opposite periphery of the outer rotor. The current supply of the electrically controllable magnet poles of the duct hoop may pass through electrical leads which are laid in the stay connecting the duct hoop to the fuselage. Slip contacts may be omitted completely in this design. By correspondingly controlling the magnet poles of the duct hoop, the outer rotor is set in rotation and rotates relative to the duct hoop.

In the embodiments according to FIG. 15, the outer rotor extends from the outer periphery of the duct hoop in an outward direction. The inner rotor is also rotatably journaled on the duct hoop and extends inwardly therefrom between the two tiers of stays. Electrically controllable poles are mounted on the duct hoop and lie opposite the permanent magnet poles secured on the outer periphery of the inner rotor so that the inner rotor also forms an electromotor together with the duct hoop. The current may also be supplied in this case through electrical leads which pass through the stays so that slip contacts are completely avoided in this case as well. The inner rotor is controlled such that it rotates in a counter-rotational sense with respect to the outer rotor.

In the embodiment according to FIG. 16, the outer rotor extends inwardly from the duct hoop between the two tiers of stays. The inner rotor is journaled with its bearing directly on the periphery of the fuselage and extends outwardly in a radial fashion between the two tiers of stays. On the inner periphery of the inner rotor there are provided permanent magnet poles which lie opposite electrically controllable magnetic poles secured to the periphery of the fuselage. The inner rotor thus forms an electromotor together with the support element of the fuselage which supports it. In this case as well, the electrical leads may be conducted directly to the electrically controlled magnetic poles of the fuselage without necessitating slip contacts. The movement of the rotors is controlled so that they rotate in counter-rotating senses.

In the embodiment according to FIG. 17, the outer rotor extends radially outwards from the outer periphery of the duct hoop as in the embodiment according to FIG. 15. The inner rotor is journaled directly on the periphery of the fuselage as in the embodiment according to FIG. 16 and extends toward the duct hoop.

FIG. 18 illustrates an aircraft, partially in cross section, in which a rotor means of the type described with respect to FIG. 17 is used. In this aircraft, the support part of the fuselage on which the inner rotor is journaled is designed as a duct hoop which forms the outermost ring of a Cardanic suspension consisting of two supports hoops as illustrated schematically in FIG. 1. In the aircraft according to FIG. 18, the cabin (the cabin of platform 32 in FIG. 1) which is suspended in the interior of this Cardanic suspension system is designed as a support hoop on which a missile, e.g. a rocket, may be mounted. The aircraft according to FIG. 18 may be used as a launching platform by means of which the rocket may be positioned at a greater height from ground level and may be given an initial acceleration. In this aircraft, an inner support hoop, which corresponds to the cabin or platform 32 of the apparatus according to FIG. 1, is designed as a doughnut-shaped body in order to improve the aerodynamic relationships during the flight of the missile and when starting the rocket.

What is claimed is:

1. An aircraft comprising,
a fuselage,
two coaxially counter-rotatable rotors,
blade mounts carried by said rotors,
each rotor being journaled to said fuselage about an imaginary axis of rotation common to both rotors,
each of said rotors carrying poles and cooperating with a counteracting pole carrying member to form at least one electromotor,
a current generator electrically connected to a pole carrying member of at least one rotor so that upon production of a frequency current a reciprocal field effect is created between counteractive members to cause counter-rotation of said rotors,
the rotational speed of each rotor being regulated directly by varying the frequency of the current supplied.

2. The aircraft according to claim 1, wherein the two rotors constitute counteractive members of one electromotor.

3. The aircraft according to claim 1, including at least one additional counteractive member provided with a plurality of poles located to oppose the poles of the respective rotors.

4. The aircraft according to claim 3, wherein each rotor forms an integral part of a high frequency electromotor together with the associated counteractive member.

5. The aircraft according to claim 4, wherein at least one rotor belongs to a plurality of synchronized electromotors.

6. The aircraft according to claim 5, wherein a number of counter-rotating rotors is arranged coaxially forming a number of synchronized electromotors.

7. The aircraft according to claim 6, wherein a number of rotors is arranged coaxially and interconnected to form one rotatable unit counter-rotatable to at least one rotor also arranged coaxially with the unit.

8. The aircraft according to claim 1, wherein the current generator is designed as a generator which is equipped with a small number of poles and which is driven at a high rotary speed.

9. The aircraft according to claim 8, wherein numbers of poles exceeding the generator pole number are provided on both rotors.

10. The aircraft according to claim 8, including at least one additional counteractive member and numbers of poles exceeding the generator pole number are provided on said at least one additional counteractive member associated with the two rotors.

11. The aircraft according to claim 1, wherein the current generator is designed as a polyphase current generator.

12. The aircraft according to claim 1, wherein the current generator is designed as a high frequency generator.

13. The aircraft according to claim 1, wherein the current generator is designed as a DC power source with a frequency converter unit connected downstream which produces the high frequency currents required to supply the poles.

14. The aircraft according to claim 1, wherein each current-supplied pole is constructed as a core of magnetizable material wound in a coil traversed by the current.

15. The aircraft according to claim 1, including a support member connected to said fuselage, conductor bands and slip contact elements provided on each rotor having poles traversed by current, said slip contact elements slidingly abutting on said conductor bands which extend concentrically to the axis of rotor rotation and which are provided on said support member and each conductor band is electrically connected to a current output of said stationary current generator.

16. The aircraft according to claim 1, including at least one selectively excitable magnet arranged on the fuselage adjacent the path of rotation of the poles of each rotor such that in the excited state, the field of the magnet acts magnetically on the magnetic fields of the poles of the respective rotor.

17. The aircraft according to claim 16, wherein each magnet is constructed as a core of magnetizable material surrounded by a coil traversed by current.

18. The aircraft according to claim 1, including a fuselage part and each of the two rotors includes at least one runner movably journaled on said fuselage part on a path about the axis of rotor rotation with poles being disposed on said runner.

19. The aircraft according to claim 1, wherein each rotor includes a plurality of interconnected runners which are arranged in spaced relation on an imaginary circle lying concentrically to the axis of rotor rotation.

20. The aircraft according to claim 1, wherein each rotor includes at least one runner which is designed as a hoop concentrically encompassing the axis of rotor rotation.

21. The aircraft according to claim 1, including a fuselage part, said fuselage part being designed as a support hoop which has on its outer periphery paths for runners of the two counter-rotating rotors.

22. The aircraft according to claim 1, wherein said rotor blade mounts of the two counter-rotatable rotors are disposed concentrically to each other, the one rotor together with the inner rotor blade mount including at least one runner arranged in one plane on which the inner rotor blade mount is secured and the other rotor including at least one upper runner arranged in a plane above the runner of the one rotor and at least one lower runner arranged in a plane below the runneer of the one rotor, the rotor blade mount of the other rotor being connected via stays which extend above and below the inner rotor blade mount, to the upper runner and to the lower runner.

23. The aircraft according to claim 1, including a support part disposed on the fuselage, stays and two support hoops, each hoop supporting one rotor blade mount, said rotor blade mounts being concentrically arranged, said hoop of the inner rotor blade mount being journaled rotatably to and in a concentric fashion outside the hoop of the outer rotor blade mount, the hoop of the outer rotor blade mount being journaled rotatably to and in a concentric fashion outside said support part and designed as a support hoop, and the outer rotor blade mount being connected to the hoop of the outer rotor via said stays which extend above and below the inner rotor blade mount.

24. The aircraft according to claim 1, including stays, a support construction supported by said fuselage and two coaxial support hoops surrounding the fuselage in axially spaced relation from one another, each hoop being connected by means of a plurality of said stays to said support construction, one rotor being rotatably journaled on these support hoops such that its rotor blades extend inwardly in a radial fashion and the other rotor is rotatably journaled on these support hoops such that its rotor blades extend outwardly in a radial fashion.

25. The aircraft according to claim 1, including a support hoop, said rotors being concentrically arranged and the outer rotor being rotatably journaled on said support hoop secured to the outer periphery of the inner rotor.

26. The aircraft according to claim 25, including a further support member supported by the fuselage, said inner rotor being rotatably journaled on said further support member.

27. The aircraft according to claim 26, wherein the inner rotor includes adjacent its journaling on the further support member magnetic poles which cooperate with electromagnetic poles on the further support member and form with them a device for electromagnetic position control of a cell suspended in the support member.

28. The aircraft according to claim 25, wherein the inner rotor is secured to a support member supported by the fuselage.

29. The aircraft according to claim 1, including a support member supported by the fuselage and stays, the rotor blade mounts of the two counter-rotatable rotors being arranged concentrically, the inner rotor being rotatably journaled on said support member and the outer rotor being connected to said support member via said stays which extend above and below the inner rotor.

30. The aircraft according to claim 1, including a support member supported by the fuselage, runners and stays, the rotor blade mounts of the two counter-rotatable rotors being arranged concentrically, the inner rotor being secured to a support member supported by the fuselage and the outer rotor including at least one runner arranged in a plane over the inner rotor and at least one runner arranged in a plane below the inner rotor, said runners being journaled in and running on paths on said support member which are coaxial to the axis of rotor rotation, the outer rotor being connected to the upper runner and to the lower runner via said stays extending above and below the inner rotor.

31. The aircraft according to claim 1, including a support member, additional counteractive members on said support member, carrier poles and a control device, each rotor forming an electromotor together with an additional counteractive member, and said control device being provided for separately controlling the current supply to the poles of each additional counteractive member so as to rotate the rotors in a counter-rotating sense.

32. The aircraft according to claim 31, including a support hoop, a support construction supported by the fuselage and stays said rotors being concentrically arranged, said support hoop surrounding the fuselage in radial spaced relation and connected to said support construction by said stays arranged in two spaced tiers and at least the outer rotor being rotatably journaled on the support hoop and forming an electromotor therewith.

33. The aircraft according to claim 32, wherein the outer rotor extends outwardly from the outer periphery of the support hoop and the inner rotor is also rotatably journaled on the support hoop and extends inwardly therefrom between the two tiers of stays and forms an electromotor together with the suppport hoop.

34. The aircraft according to claim 32, wherein the outer rotor extends inwardly from the inner periphery of the support hoop between the two tiers of stays and the inner rotor is rotatably journaled on said support construction and extends outwardly between the two tiers of stays in radial fashion and forms an electromotor together with said support construction.

35. The aircraft according to claim 32, wherein the outer rotor extends outwardly from the outer periphery of the support hoop and the inner rotor is rotatably journaled on said support construction and extends outwardly between the two tiers of stays in a radial fashion and forms an electromotor together with said support construction.

36. The aircraft according to claim 1, including control means to subdivide the high frequency current into individual current pulses of a specific sign and to supply specific pulse trains to the poles in response to the energy and the desired supply frequency to be fed to the respective rotor.

37. The aircraft according to claim 36, including a measuring instrument for ascertaining the energy and frequency required for each rotor and for influencing the control means.

38. The aircraft according to claim 36, wherein the control means is designed such that it controls the energy supply and frequency of the currents supplied to the pole coils from the power source in response to a feedback of the currents which is induced by the relative movement of rotor poles to an associated support member component part poles in the coils of the latter.

39. The aircraft according to claim 1, wherein a plurality of rotors constitute one electromotor.

40. The aircraft according to claim 1, including a structural part and two cardan hoops, at least one of the rotors being journaled to said structural part of the outer one of said two cardan hoops which together with respective bearings belong to a 3-axial cardan suspension supporting a cell.

41. The aircraft according to claim 1, including a support member and two cardan hoops one of which carries a structural part, a component part of the support member which is provided with at least one of the counter-acting members of the electromotor formed by at least one rotor and at least one counteracting member being rigidly connected with said structural part of the outer one of the two said cardan hoops which together with respective bearings belong to a 3-axial cardan suspension supporting a cell.

42. The aircraft according to claim 1, wherein each of the counteractive members is formed by an independent counteractive member fixed to the fuselage.

43. The aircraft according to claim 1, wherein each rotor is journaled around said fuselage, said imaginary axis of rotation passing through said fuselage.

* * * * *